(12) United States Patent
Komo et al.

(10) Patent No.: US 12,322,217 B2
(45) Date of Patent: *Jun. 3, 2025

(54) SYSTEM AND METHOD FOR CRYPTOGRAPHIC CHOICE MECHANISMS

(71) Applicant: EFFICIENT AUCTIONS LLC, Washington, DC (US)

(72) Inventors: Andrew Komo, Washington, DC (US); Lawrence M. Ausubel, Washington, DC (US)

(73) Assignee: EFFICIENT AUCTIONS LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,706

(22) Filed: Feb. 16, 2024

(65) Prior Publication Data

US 2024/0185662 A1 Jun. 6, 2024

Related U.S. Application Data

(63) Continuation of application No. 18/167,703, filed on Feb. 10, 2023, now Pat. No. 11,908,249, which is a (Continued)

(51) Int. Cl.
*G07C 13/00* (2006.01)
*G06F 16/2457* (2019.01)
*H04L 9/12* (2006.01)

(52) U.S. Cl.
CPC ..... *G07C 13/005* (2013.01); *G06F 16/24578* (2019.01); *H04L 9/12* (2013.01); *H04L 2209/08* (2013.01)

(58) Field of Classification Search
CPC . G07C 13/005; G06F 16/24578; G06F 21/60; H04L 9/12; H04L 2209/08; (Continued)

(56) References Cited

U.S. PATENT DOCUMENTS

| 4,972,475 A | 11/1990 | Sant'Anselmo | 380/54 |
| 7,729,975 B2 | 6/2010 | Ausubel et al. | 705/37 |

(Continued)

OTHER PUBLICATIONS

Notification of Transmittal of the International Search Report and the Written Opinion of the International Searching Authority, or the Declaration dated Dec. 11, 2018, issued by the United States Patent & Trademark Office in corresponding application PCT/US18/52695.

(Continued)

*Primary Examiner* — Matthew Mikels
(74) *Attorney, Agent, or Firm* — Stein IP, LLC

(57) ABSTRACT

The present invention provides an improved system and method for using cryptography to secure computer-implemented choice mechanisms. In several preferred embodiments, a process is provided for securing participants' submissions while simultaneously providing the capability of validating their submissions. This is referred to as a random permutation. In several other preferred embodiments, a process is provided for securing participants' advance instructions while simultaneously providing the capability of validating their advance instructions. This is referred to as a secure advance instruction. Applications include voting mechanisms, school choice mechanisms, and auction mechanisms.

96 Claims, 19 Drawing Sheets

Network diagram of central computer and all other computer systems

Related U.S. Application Data continuation of application No. 17/838,977, filed on Jun. 13, 2022, now Pat. No. 11,580,808, which is a continuation of application No. 17/378,142, filed on Jul. 16, 2021, now Pat. No. 11,361,607, which is a continuation of application No. 17/129,159, filed on Dec. 21, 2020, now Pat. No. 11,069,171, which is a continuation of application No. 16/829,811, filed on Mar. 25, 2020, now Pat. No. 10,872,487, which is a continuation of application No. PCT/US2018/052695, filed on Sep. 25, 2018.

(60) Provisional application No. 62/721,328, filed on Aug. 22, 2018, provisional application No. 62/596,379, filed on Dec. 8, 2017.

(58) Field of Classification Search
CPC . H04L 63/12; H04L 63/0407; G06Q 2230/00; G06Q 30/08; G06Q 50/34
See application file for complete search history.

(56) References Cited

U.S. PATENT DOCUMENTS

| | | | | |
|---|---|---|---|---|
| 10,872,487 | B2 * | 12/2020 | Komo | G07C 13/005 |
| 11,069,171 | B2 * | 7/2021 | Komo | H04L 63/0407 |
| 11,361,607 | B2 * | 6/2022 | Komo | H04L 63/12 |
| 11,580,808 | B2 * | 2/2023 | Komo | G06Q 30/08 |
| 11,908,249 | B2 * | 2/2024 | Komo | H04L 63/12 |
| 2010/0185863 | A1 | 7/2010 | Rabin et al. | 713/171 |
| 2011/0055039 | A1 | 3/2011 | Paz | 705/26.3 |
| 2011/0295752 | A1 | 12/2011 | Parkes et al. | 705/64 |
| 2014/0081717 | A1 | 3/2014 | Lu et al. | 705/12 |
| 2017/0109955 | A1 | 4/2017 | Ernest et al. | G07C 13/00 |
| 2017/0206611 | A1 | 7/2017 | Morgia | |

OTHER PUBLICATIONS

X. I. Selvarani, M. Shruthi, R. Geethanjali, R. Syamala and S. Pavithra, "Secure voting system through SMS and using smart phone application," 2017 International Conference on Algorithms, Methodology, Models and Applications in Emerging Technologies (ICAMMAET), Chennai, 2017 (Year: 2017).

ISAIM 2012 (International Symposium on Artificial Intelligence and Mathematics (ISAIM 2012), Fort Lauderdale, Florida, USA, Jan. 9-11, 2012) Proceedings, 2012, arXiv: 1010.2312 [math.QC] (Year: 2012).

Jie Zhong and P. R. Wurman, "A framework for computing the outcome of proxied combinatorial auctions," Seventh IEEE International Conference on E-commerce Technology (CEC'05), Munich, Germany, 2005, pp. 25-32, doi: 10.1109/ICECT.2005.3. (Year: 2005).

Suzuki Koutarou et al: "Secure 1-28 Generalized Vickrey Auction Using Homomorphic Encryption", Financial Cryptography, Jan. 1, 2003 (Jan. 1, 2003), pp. 239-249, XP055826635, Berlin, Heidelberg DOI: 10.1007/978-3-540-45126-6_17; ISBN: 978-3-540-45126-6; Retrieved from the Internet: URL:https://link.springer.com/content/pdf/10.1007/978-3-540-45126-6 17.pdf [retrieved on Jul. 22, 2021].

Parkes, D.C., Rabin, M.O., and Thorpe, C., "Cryptographic Combinatorial Clock-Proxy Auctions", Feb. 23, 2009. In: Dingledine, R., Golle, P. (eds) Financial Cryptography and Data Security. FC 2009. Lecture Notes in Computer Science, vol. 5628. Springer, Berlin, Heidelberg. https://doi.org/10.1007/978-3-642-03549-4_19.

* cited by examiner

Network diagram of central computer and all other computer systems

Arrangement for Node x to communicate with Central using Proxy x

Arrangement for Node x to communicate with Central using Proxy x and Intranet 30x Different computer systems interacting with storage (Bulletin Board)

Overview of entire process of cryptographic choice mechanism

Detail of validation process during a submission round for an exemplary voting mechanism (Step 112)

Detail of validation process during a submission round for an exemplary school choice mechanism (Step 112)

Detail of validation process during a submission round for an exemplary auction mechanism (Step 112)

Detail of validation process after a submission round for an exemplary voting mechanism (Step 126)

Detail of validation process after a submission round for an exemplary school choice mechanism (Step 126)

Detail of validation process after a submission round for an exemplary auction mechanism (Step 126)

Detail of results verification process when a proxy is not in use (Step 134)

Detail of results computation process for an exemplary auction mechanism (Step 131)

SYSTEM AND METHOD FOR CRYPTOGRAPHIC CHOICE MECHANISMS

RELATED APPLICATIONS

This application is a continuation of U.S. application Ser. No. 18/167,703, filed on Feb. 10, 2023, now patented as U.S. Pat. No. 11,908,249, which is a continuation of U.S. application Ser. No. 17/838,977, filed on Jun. 13, 2022, now patented as U.S. Pat. No. 11,580,808, issued on Feb. 14, 2023, which is a continuation of U.S. application Ser. No. 17/378,142, filed on Jul. 16, 2021, now patented as U.S. Pat. No. 11,361,607, issued on Jun. 14, 2022, which is a continuation of U.S. application Ser. No. 17/129,159, filed on Dec. 21, 2020, now patented as U.S. Pat. No. 11,069,171, issued on Jul. 20, 2021, which is a continuation of U.S. application Ser. No. 16/829,811, filed on Mar. 25, 2020, now patented as U.S. Pat. No. 10,872,487, issued on Dec. 22, 2020, which is a continuation of International Application No. PCT/US2018/052695, filed on Sep. 25, 2018, which claims priority to U.S. Provisional Application No. 62/721,328, filed on Aug. 22, 2018 and U.S. Provisional Application No. 62/596,379, filed on Dec. 8, 2017, the disclosures of the aforementioned applications are hereby incorporated by reference in their entireties.

FIELD OF THE INVENTION

The present invention relates to improving computer-implemented cryptographic systems and methods, and, more particularly, to an improved system and method for using cryptography to secure computer-implemented choice mechanisms.

BACKGROUND OF THE INVENTION

Choice mechanisms, such as voting mechanisms, auction mechanisms, and other mechanisms for eliciting preferences and aggregating them to reach decisions or allocations, have existed for literally thousands of years. In recent years, practitioners have begun implementing choice mechanisms on computer systems and networks. One of the important advantages of a computer-implemented choice mechanism is that it validates the participant's submission at the time of the submission. Recall the fiasco that occurred in Florida in the 2000 election (which was implemented on a version of punch cards) when hundreds of ballots were not counted on account of "hanging chads". Or consider the problem in an auction where a bid submitted in a sealed envelope is thrown out on account that it is illegible or the pricing is not expressed in the right basis. A good computer-implemented choice mechanism validates the submission and gives the participant real-time feedback if the submission is inconsistent with the mechanism's rules.

A second advantage of a computer-implemented choice mechanism is that it can utilize an encryption protocol so that the administrative personnel managing the mechanism cannot cheat by tampering with submissions or disclosing submissions early to other participants. Anyone associated with elections is concerned about vote-rigging, the stuffing of ballot boxes, or the premature release of results. In an auction, if administrative personnel can see one participant's bid when it is submitted, the administrative personnel can tip off another participant that it needs to submit a higher price in order to win.

In the existing art, validating participants' submissions and securing their submissions are generally in conflict. If the computer system validates the submission, then administrative personnel who can access the system can also "see" the submission. Conversely, if the system receives an encrypted submission that cannot be deciphered until after the end of the submission round, then the system is also unable to validate the submission until after the end of the submission round, precluding the possibility of timely corrections by participants.

In several preferred embodiments, the present invention provides a system and method for securing participants' submissions while simultaneously providing the capability of validating their submissions.

For choice mechanisms such as iterative auctions, there have also long existed procedures enabling a participant to participate without being physically present or, in the case of an online mechanism, being online at the relevant times. For example, iterative auctions sometimes allow "proxy bidding," whereby the participant enters an advance instruction (its pricing limit) into the system and the system automatically places bids as necessary up to that limit. However, the presence of advance instructions can worsen the problem of administrative personnel disclosing submissions early to other participants: a dishonest administrative personnel can not only disclose the participant's current submission to another participant, but can also disclose the participant's bidding limit.

In the existing art, validating advance instructions and securing advance instructions are generally in conflict. If the computer system is able to validate the advance instructions, then administrative personnel who can access the system can also "see" the advance instructions and "leak" the advance instructions. Conversely, if the system receives an encrypted set of advance instructions that cannot be deciphered until after the end of the submission round, the system is also unable to validate the set of advance instructions until after the end of the submission round, precluding the possibility of timely corrections by participants.

In several preferred embodiments, the present invention provides a system and method for securing participants' advance instructions while simultaneously providing the capability of validating the advance instructions.

SUMMARY OF THE INVENTION

The present invention is an improved system and method for cryptography over a computer network with: a plurality of computer systems; a storage location where all of the computer systems can read or write with pseudonymity; a central computer system that knows the pseudonyms of the other computer systems and uses an identifiable name on the storage location; a process wherein a commitment to a value is created at a definite time such that the value cannot be learned from the commitment and the value is the only possible option to be revealed from the commitment; and a network setup wherein the central computer system can send information to the other computer systems and the other computer systems can send information to the central computer system.

The present invention is also an improved system and method for using cryptography to secure a choice mechanism implemented using a computer network. The choice mechanism asks a plurality of participants to make choices from a plurality of possible choices. The choices may include identifying one or more elements of a set, ranking one or more elements of a set, identifying a quantity of one or more elements of a set, associating a price with one or more elements of a set, associating a parameter with one or more elements of a set, or associating a plurality of parameters with one or more elements of a set. The choice mechanism may be static or dynamic: choices may be made at one or more times, or in one or more submission rounds. The computer network on which the choice mechanism is implemented includes: a plurality of computer systems; a storage location where all of the computer systems can read or write with pseudonymity; a central computer system that knows the pseudonyms of the other computer systems and uses an identifiable name on the storage location; a process wherein a commitment to a value is created at a definite time such that the value cannot be learned from the commitment and the value is the only possible option to be revealed from the commitment; and a network setup wherein the central computer system can send information to the other computer systems and the other computer systems can send information to the central computer system.

In several preferred embodiments, the present invention provides a system and method for securing participants' submissions while simultaneously providing the capability of validating their submissions. In the following text, such an embodiment will often be referred to as a random permutation.

In several other preferred embodiments, the present invention provides a system and method for securing participants' advance instructions while simultaneously providing the capability of validating their advance instructions. The element being secured and validated will often be a "proxy bid", but we will try to avoid using the word "proxy" in the following text to avoid confusion with a distinct meaning of "proxy". Therefore, in the following text, such an embodiment will often be referred to as a secure advance instruction. However, it should be explicitly noted that a "proxy bid" shall always be intended as a special case of an "advance instruction", and that all descriptions below of "secure advance instructions" shall also describe and encompass "secure proxy bids".

The random permutation and secure advance instructions system and method described in this application are novel and useful, even if there is no associated choice mechanism. In particular, the random permutation approach can be applied in any scenario where the participant associates parameters to various items, but the participant's privacy is effectively preserved to the extent that the central computer only knows the parameters associated with abstract items but does not know the true item mapped to each abstract item. Similarly, the secure advance instructions approach can be applied in any scenario in which the participant provides any parameter some number of rounds in advance, and it is sufficient for the instructions to be tested against the current round's parameter, without a need to know the participant's ultimate parameter.

A computer system can be, but is not limited to, a generic computer, a special-purpose computer, a server, or a mobile device. A pseudonym is defined as a username that links information written by the same computer system. This differs from an anonymous system where it is impossible to tell if two pieces of information came from the same source. A commitment takes the form of a numerical string on the computer system. A dynamic choice mechanism is a process wherein specific choices are made at a time (or in a submission round) and choices made at previous times (or in previous submission rounds) affect the choices offered at future times (or in future submission rounds). In some preferred embodiments where rounds are utilized, each round is distinct and takes place at a separate time from a different round, although two rounds can occur without any pause in between.

The network may be a local or wide area network such as, for example, the Internet, an intranet or a virtual private network, or alternatively a telephone system, either public or private, a facsimile system, an electronic mail system, a wired data network, a wireless data network, or any other network.

In some embodiments of the invention, there is a time (or round) after all the choice times (or rounds) have concluded, to confirm that all of the rules of the iterative choice model have been followed. Having a final time or round for verification is an improvement over the prior art because it allows verification to take place when there is no longer a time constraint of having to move on to a subsequent time (or to the next round) for more choices to be made.

In some embodiments of the invention, there is an additional set of computer systems beyond the original computer systems. A computer system in this additional set will be referred to as a proxy. Any computer system that is neither a proxy nor the central computer system can be associated with a proxy. In many preferred embodiments, whether any computer system has an associated proxy is known only to that computer system and to the associated proxy (if one exists).

In a first preferred embodiment, the present invention is:
A method for securely implementing a choice mechanism, said method implemented on a computer system comprising at least one computer, said choice mechanism using submissions that express choices taken from a plurality of possible choices, said method comprising:
  receiving a submission on a computer of said computer system, wherein said submission expresses choices and wherein the choices expressed within the submission are encrypted; and
  validating said submission on said computer, wherein said validating is in relation to one or more constraints on the encrypted choices expressed within said submission.

In a second preferred embodiment, the present invention is a computer system for securely implementing a choice mechanism according to the method of the first preferred embodiment. The system includes a receiving means and a validating means.

In a third preferred embodiment, the present invention is:
A method for enabling a participant to participate securely in a choice mechanism, said method implemented on a computer system comprising at least one computer, said choice mechanism using submissions that express choices taken from a plurality of possible choices, said method comprising:
  encrypting a submission on a computer of said computer system, wherein said submission expresses choices and wherein the choices expressed within the submission are encrypted by a process of random permutation; and
  sending the submission with encrypted choices from said computer to another computer.

In a fourth preferred embodiment, the present invention is a computer system for enabling a participant to participate securely in a choice mechanism according to the method of the third preferred embodiment. The system includes an encrypting means and a sending means.

In a fifth preferred embodiment, the present invention is:
A method for enabling a participant to participate securely in a choice mechanism, said method implemented on a computer system comprising at least one computer, said choice mechanism using submissions that express choices taken from a plurality of possible choices, said method comprising:

encrypting a submission on a computer of said computer system, wherein said submission expresses choices and wherein the choices expressed within the submission are encrypted by a process of secure advance instructions; and sending the submission with encrypted choices from said computer to another computer.

In a sixth preferred embodiment, the present invention is a computer system for enabling a participant to participate securely in a choice mechanism according to the method of the third preferred embodiment. The system includes an encrypting means and a sending means.

Other preferred embodiments of the present invention involve encrypting any information using a process of random polynomials, a process of random permutation, or a process of secure advance instructions—and validating or otherwise processing the encrypted information—outside of any choice mechanism.

DETAILED DESCRIPTION

Preliminaries on Cryptographic Elements

Figure 1:
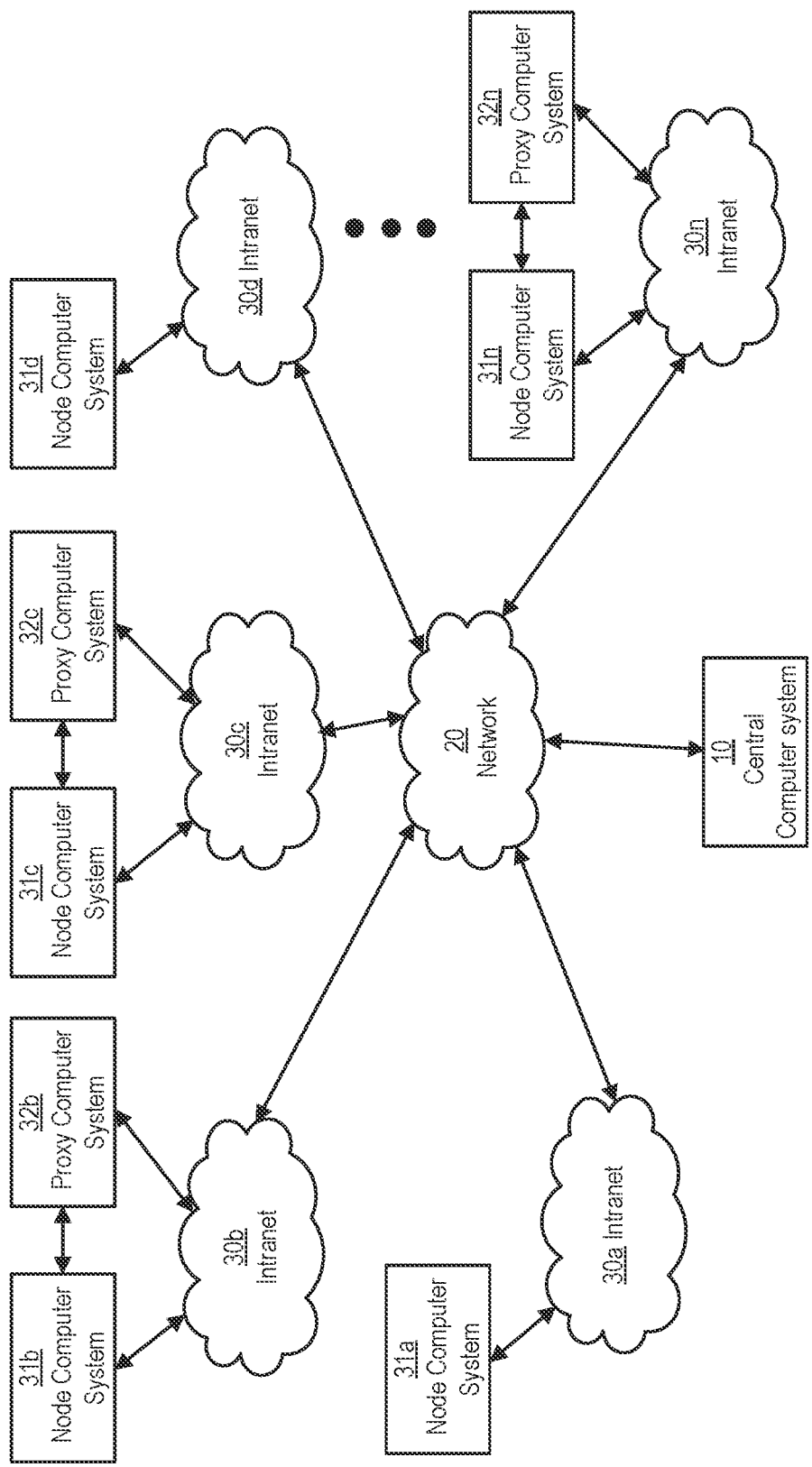
FIG. 1 is a network diagram in accordance with an embodiment of the invention.

A commitment scheme allows a party to bind itself to a value without revealing what the value is. In a commitment scheme, there is a commit phase and a reveal phase. During the commit phase, a party provides a commitment to a value while hiding what the value actually is. During the reveal phase, a party opens the commitment to reveal the value that was hidden by it. In some embodiments, a commitment scheme known as the Fujisaki-Okamoto commitment scheme is used. To define the Fujisaki-Okamoto commitment scheme, let N be a large composite number, $\mathbb{Z}_N$ be the residue class ring of integers modulo N, $\mathbb{Z}^*_N$ be the multiplicative group of invertible elements in $\mathbb{Z}_N$, and g be a generator of large order in $\mathbb{Z}^*_N$. Also let h be an element randomly generated by g and $s_r$ be a security parameter. If Alice is sending a commitment to Bob, we assume that Alice does not know the factorization of N, the discrete log of g base h, or the discrete log of h base g. In order to create a commitment for the value x, Alice first chooses $r \in_R \{-2^{s_r}N+1, \ldots, 2^{s_r}N-1\}$ where $\in_R \{ \ldots \}$ denotes the uniform random selection of an element in a set. During the commit phase, Alice creates her commitment $E=E(x,r)=g^x h^r \bmod N$ which we denote as a commitment to (x,r) in base (g,h). During the reveal phase, Alice opens her commitment for Bob by sending him (x,r). (x,r) functions effectively as a key for the commitment. The key, (x,r), uniquely defines the commitment and without the key the commitment is indistinguishable from a random number.

The Fujisaki-Okamoto commitment scheme is computationally binding and statistically hiding. Computationally binding means that Alice cannot find (x',r') such that $E(x,r)=E(x',r')$. In order to find (x',r'), Alice would have to find the discrete log of g in base h or the discrete log of h in base g, which is thought to be computationally infeasible for a sufficiently large modulus with unknown factorization. Alice being unable to find (x',r') means that she can only open E to reveal x and not any other value. Statistically hiding means that Bob learns no information about x from E. Specifically, there are many (x',r') such that $E(x,r)=E(x',r')$ so even if Bob finds a pair (x',r') he does not know if x=x'. This commitment scheme is also additive homomorphic, i.e., $$E(x_1, r_1)E(x_2, r_2) = (g^{x_1}h^{r_1})(g^{x_2}h^{r_2}) \bmod N = g^{x_1+x_2}h^{r_1+r_2} \bmod N = E(x_1+x_2, r_1+r_2)$$

This property allows a party to find the commitment to the sum of two values without knowing either value.

The Boudot proof is a non-interactive, zero-knowledge proof that an integer lies in the interval [a,b]. A zero-knowledge proof (ZKP) is a demonstration by the prover of some fact without revealing any other information to the verifier. Non-interactive means that the prover sends the verifier some data once and then the verifier is convinced that the fact being proved is correct, referred to as "the proof succeeding", without further interaction with the prover. The Boudot proof utilizes the Fujisaki-Okamoto commitment scheme. Using the security parameters $s_0$ and $s_1$, the proof that $x \in [a, b]$ succeeds with probability less than $2^{-s_0+1}$ if x does not lie in the interval, succeeds with probability greater than $1-2^{-s_1}$ if x is in the interval, and reveals statistically zero-knowledge as long as $1/s_1$ is negligible. In some embodiments, the Boudot proof will be used for automated bidding to check if $b_{ijk} \geq p_{kj}$ by checking if $b_{ijk} \in [p_{kj}, b]$ where b is the maximum acceptable bid and hence the maximum of all intervals to check during the auction. This maximum should be much larger than any expected bid. For example, the maximum acceptable bid could be $10^6$ when A is expecting bids around $10^3$.

Preliminaries on Choice Mechanisms

For the purposes of this application, a choice mechanism is defined as a procedure that asks a plurality of participants to make choices from a plurality of possible choices. Said choices may include identifying one or more elements of a set, ranking one or more elements of a set, identifying a quantity of one or more elements of a set, associating a price with one or more elements of a set, associating a parameter with one or more elements of a set, or associating a plurality of parameters with one or more elements of a set. The choices expressed by participants in a choice mechanism are sometimes referred to as reports, disclosures, votes, bids, rankings, preferences, or by other names; when "choice" is used in the current document, it is intended to encompass all of these other possible terms. In many cases, the choice mechanism aggregates the choices elicited from participants into a decision, outcome or allocation.

Plurality voting is one example of a choice mechanism. The set defining the possible choices is typically a list of n candidates. In one common form of plurality voting for k positions (k≥1), each participant (i.e., each voter) is asked to select k candidates from the list of n candidates. After the submission round, the mechanism totals up the number of votes for each of the n candidates, and the k candidates who receive the most votes are deemed the winners. Plurality voting with k=1 is probably the most common form of voting in the U.S.

Ranked choice voting is a second example of a choice mechanism. Again, the set defining the possible choices is typically a list of n candidates. However, unlike plurality voting, participants are now asked to rank the candidates instead of merely to select among the candidates. In one form of ranked choice voting (called "instant-runoff voting"), each participant is asked to rank the candidates from 1 to n. After the submission round, the mechanism considers the first choice of each participant. If no candidate is the first choice of the majority of the participants, then all votes cast for the candidate with the lowest number of first choices are redistributed to the remaining candidates based on who is ranked next by the respective participant. If this redistribution of votes does not result in any candidate receiving a majority, further redistributions occur by successive eliminations of the candidate with the lowest number of votes, until one candidate is deemed to receive a majority of votes cast.

A potential advantage of ranked choice voting over plurality voting is that it may better reflect majority opinion and it may be more resistant to manipulation. However, truthful bidding is not a dominant strategy in instant-runoff voting. Selection of a Condorcet winner may be a preferable form of ranked choice voting. We call a given candidate a Condorcet winner if this candidate would receive a majority of the votes in each hypothetical two-way race against every other candidate, where the outcome of the hypothetical race is calculated based on the submitted ranked choices. However, some voting data yields "Condorcet cycles" without any winner, so a fallback criterion is also needed.

School choice is a third example of a choice mechanism. In one exemplary embodiment of school choice, the participants are the students in a school district (or their families). Each participant is asked to rank their k favorite public schools from 1 to k, where k≤n, the number of schools in the district. Meanwhile, each school is imputed to have preferences over students, but these preferences are formulaic; for example, a school prefers students who live within walking distance of the school over students who require transportation, and a school prefers students who already have siblings enrolled in the school over students who do not. After the submission round, the mechanism runs the student-proposing Gale-Shapley Deferred-Acceptance algorithm using the participants' submitted rankings and the schools' formulaic preferences to determine the allocation of students to schools. Many other embodiments of school choice mechanisms are also possible, for example, those that use a different algorithm in place of the student-proposing Gale-Shapley Deferred Acceptance algorithm, such as variants on the Boston Mechanism or Gale's Top Trading Cycle algorithm.

A single-item clock auction is a fourth example of a choice mechanism. The participants are bidders and the mechanism is conducted dynamically, with a series of submission rounds. In round k, a central computer announces the clock price $p_k$. A participant may place a bid of $p_k$ if she placed a bid of at least $p_{k-1}$ in the previous round. In some embodiments, she may instead choose to place any bid between $p_{k-1}$ and $p_k$. Once a participant bids less than $p_k$ in round k, she is not permitted to bid in future rounds and she is out of the auction (unless she wins in round k). The auction ends once no more than one participant bids the clock price. In some embodiments, a reserve price, rp, is maintained and an item will only be sold if the highest bid is at least rp. The reserve price is frequently kept as a secret by the central computer, which simply announces at the end of the auction whether the reserve was met. The auction is frequently structured with a second-price system. This means that instead of the winning participant paying the price of her own bid, she pays the price of the second highest bid (or rp, whichever is greater). This system takes advantage of a well-known result in auction theory that the dominant strategy for a bidder in a single-item, second-price auction is to bid her true value for the item. Other pricing rules are also possible.

A multi-unit clock auction is a fifth example of a choice mechanism. The participants are bidders and the mechanism is conducted dynamically, with a series of submission rounds. The auction may be for a single type of item (a "homogeneous" good) or for multiple types of items ("heterogeneous" goods). When items are homogeneous, then instead of a bidder declaring whether she wants to bid for the item at the clock price, she instead indicates the quantity of items that she wants at the clock price. If bids are allowed between clock prices, then a bidder may submit a demand schedule of the number of items she desires at any price point between the clock prices. The auction ends once the sum of the participants' quantities is less than or equal to the available quantity. With heterogeneous goods, the central computer announces a vector of clock prices and the participant submits choices of a vector of quantities of the respective items. Then, the auction ends when the sum of the participants' quantities is less than or equal to the available quantity for each type of item. In some embodiments, a reserve price, rp, is maintained and items will only be sold if the highest bid is at least rp. More generally, there may be a "supply curve" or a "demand curve", in which the available quantity depends on the price level. The auction is frequently structured with a uniform price system. This means that instead of the winning participants paying the prices of their own bids, they pay the "clearing" price, i.e., the price at which supply equals demand. Other pricing rules are also possible.

A simultaneous multiple round auction (SMRA) is a sixth example of a choice mechanism. The participants are bidders and the mechanism is conducted dynamically, with a series of submission rounds. In its most common form, multiple items are auctioned but each item is treated as being unique, so that its available quantity is one. In each submission round, a participant submits bids, comprising an item and a price. After the submission round, the participant who submitted the highest new bid for an item is deemed to be the "standing high bidder"; ties are broken by draws of random numbers. If no new bid is received for an item, the previous standing high bidder (if any) remains the standing high bidder. It is unnecessary for the standing high bidder in a given submission round to bid for the item. The auction ends when a submission round elapses with no new bids, and then the standing high bidders win the items at their respective bid amounts.

One of the most useful aspects of the above auction mechanisms is price discovery: participants obtain information about opponents' bids after each submission round, conveying and aggregating information to them. Price discovery occurs only to the extent that participants bid seriously. For that reason, the above auction mechanisms often include activity rules, which constrain participants' choices in the current submission round based on their choices in prior submission rounds. For example, as already described in the overview of the single-item clock auction, a common activity rule is "irrevocable exit": the participant is only allowed to bid to $p_k$ in the current submission round if the participant bid to $p_{k-1}$ in the previous round. For example, as already described in the overview of the multi-unit clock auction for a homogeneous good, a common activity rule is "monotonicity": the participant is only allowed to bid a quantity at $p_k$ that is less than or equal to the quantity that the participant bid at $p_{k-1}$.

For an auction of heterogeneous goods—which may be a multi-unit clock auction or may be an SMRA—a common activity rule is "point monotonicity". For example, consider a spectrum auction for telecommunications licenses. It might be deemed that a New York license is assigned 40 points, a Los Angeles license is assigned 20 points, and a Washington DC license is assigned 10 points. Under point monotonicity, a participant is allowed to bid for {NY, LA} in round 1 (60 points), {NY} in round 2 (40 points), {NY} in round 3 (40 points), {LA, DC} in round 4 (30 points), {LA} in round 5 (20 points), and {DC} in round 6 (10 points). However, any changes in the opposite direction would cause the number of points to increase, violating monotonicity, and would not be permitted. In a clock auction, the participant's activity in a given round is considered to be the dot product of the quantity submitted for each type of item and the number of points associated with that item. In an SMRA, the participant's activity is considered to be the sum of the points associated with the participant's new bids plus the sum of the points associated with the participant's standing high bids. In some activity rules, relaxations of point monotonicity are permitted. Still other activity rules are based upon revealed preference considerations.

In the simplest version of an activity rule for heterogeneous goods, every item is assigned the same number of points. In that event, the activity rule is simply that the number of items included in the participant's choice must be non-increasing from each round to the next.

Embodiments involving auctions with a single item, homogenous items, and non-homogenous items can all include automated bidding. Let an automated bid in this context mean that a bidder bids more than the clock price for an item. A bid greater than the clock price is treated by the rules of the auction as a bid at the clock price for all rounds in which it is greater than or equal to the clock price.

A sealed-bid auction is a seventh example of a choice mechanism. The participants are bidders and the mechanism is conducted statically, with a single submission round. The auction may be for a single item or for multiple items; and, if for multiple items, they may be homogeneous or heterogeneous goods. For a single item, a common sealed-bid auction is a first-price auction: the highest bidder wins the item and pays the amount of its bid. Another interesting sealed-bid auction is a second-price auction: the highest bidder wins the item but pays the amount of the second-highest bid. For heterogeneous goods, one of the most interesting approaches is known as package bidding. Each bid comprises a subset of the set of all items and an associated price parameter: the bids are taken to be "all or nothing"; the participant wins the entire specified subset of items, or wins nothing and pays nothing. To determine the allocation in such an auction, the central computer solves the winner determination problem of finding the feasible combination of bids that maximizes the sum of the associated price parameters.

Any of the above auction mechanisms can be restated as a procurement (or "reverse") auction. In that event, the winning bid is the lowest, rather than the highest bid; or the feasible combination of bids that minimizes the sum of the associated price parameters. Moreover, rather than paying for the items, the winners are paid for supplying the item. For example, in a second-price procurement auction of a single item, the lowest bidder wins the contract to provide the item but is paid the amount of the second-lowest bid.

As seen in the foregoing, a choice mechanism may be static or dynamic. In a static mechanism, choices are made in a single submission round or at a single time. In a dynamic mechanism, choices are made in more than one submission round or at more than one time.

Overall Structure

The invention uses a network connecting at least two computer systems, and at least one computer connecting through an intranet service. FIG. 1 illustrates the interaction between the various computer systems. In many embodiments, Computer 10 is the only computer system that the various intranets interact with. It will hereby be referred to as Central. Network 20 represents a computer network that multiple, non-localized computer systems can connect to simultaneously. In an example embodiment, Network 20 is the Internet. Examples of Intranet 30a-n include, but are not limited to, virtual private network (VPN) and local area network (LAN). These intranet services prevent Central from knowing the computer system that sends information through the intranet. Let x be any letter between a-n, inclusive. Connected to Intranet 30x is Computer 31x, which will heretofore be referred to as Node x. In some embodiments, for any x, there may exist Computer 32x, which will hereby be referred to as Proxy x. Proxy x may have a direct transmission line to Node x and is connected to Intranet 30x. This proxy would be a third party Computer that may or may not be directly controlled by Node x. When it is stated that Central communicates with Intranet 30x, what is meant is that Central communicates with either Node x or Proxy x through Intranet 30x without any knowledge of whether it is Node x or Proxy x that is being communicated with.

Figure 2A:
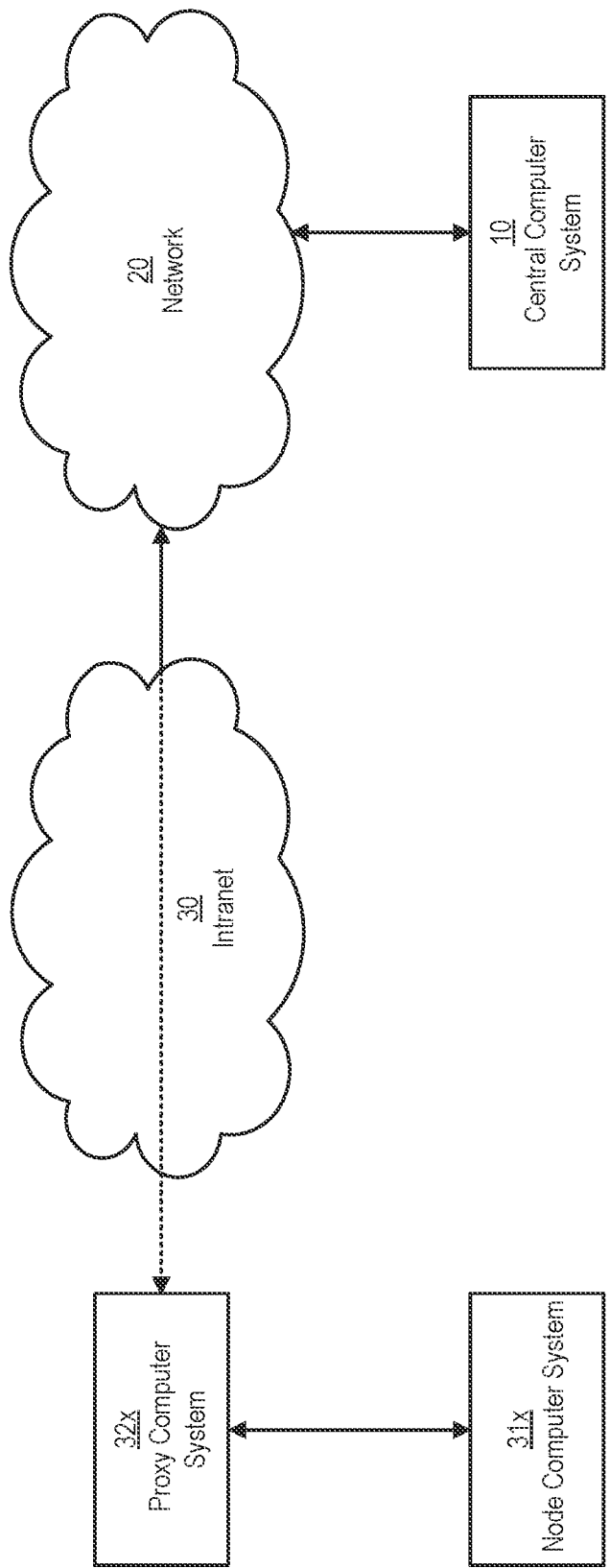
FIGS. 2a and 2b are depictions of communications arrangements in accordance with an embodiment of the invention.
Figure 2B:
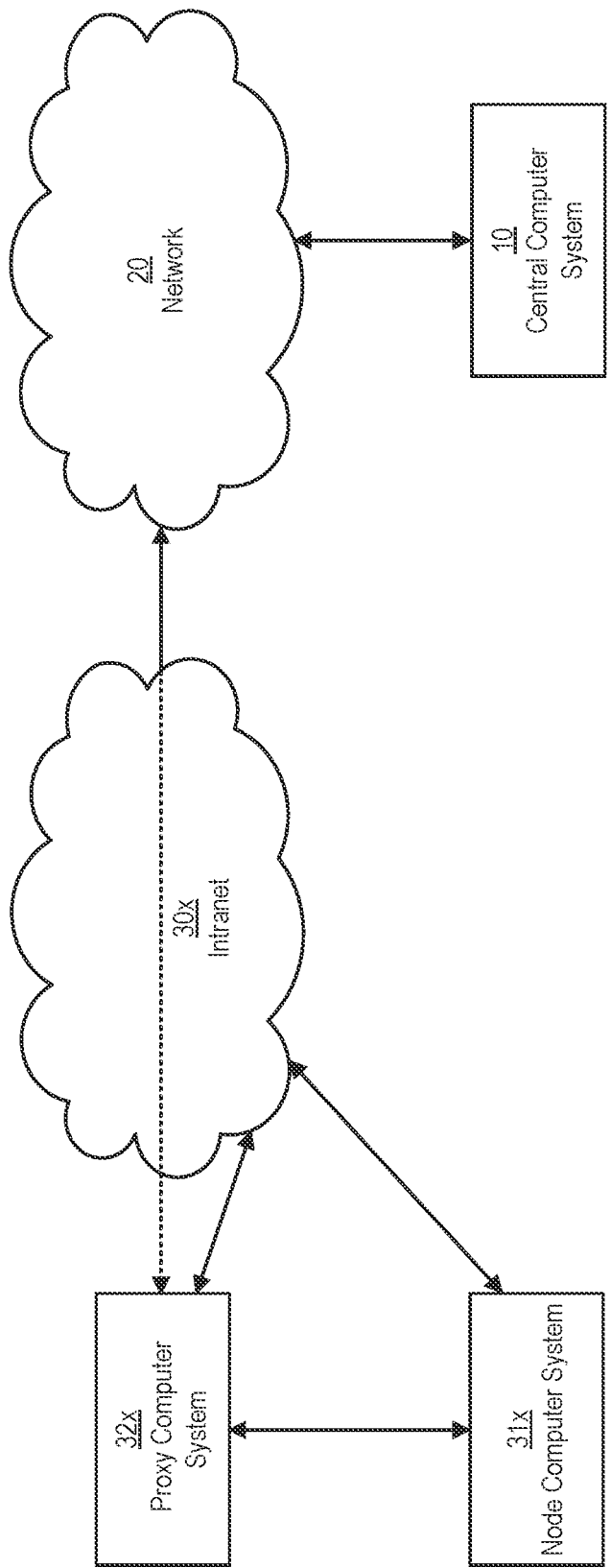

FIG. 2a details how for any x where there exists Proxy x, Node x would communicate with Central by going directly through Proxy x. Node x would send information to Proxy x using the direct transmission line and Proxy x would then send that information through Intranet 30x to Network 20 which is then relayed to Central. Central sends information back to Proxy x by performing the previous steps in the opposite manner. Central cannot know if it is communicating with Proxy x or Node x due to the transmission over Intranet 30x, which masks the original sender. FIG. 2b represents a different embodiment of the same process whereby Node x sends information through Intranet 30x to Proxy x. Information is then relayed from Proxy x to Central in the same manner as described for the computers in FIG. 2a.

Figure 3:
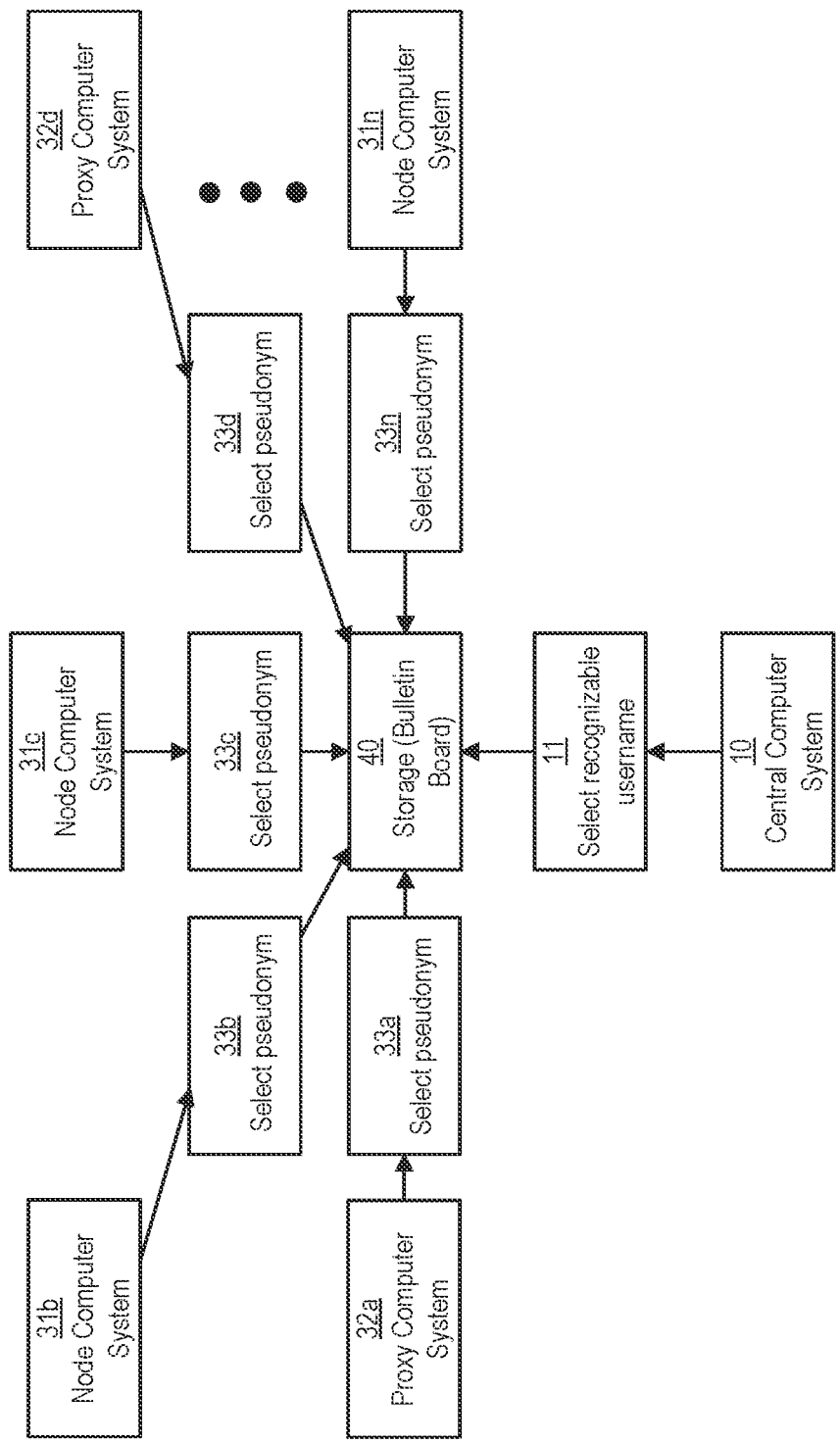
FIG. 3 depicts interaction with storage (Bulletin Board) in accordance with an embodiment of the invention.

FIG. 3 shows how all computer systems interact with Storage 40. Storage 40 is a storage location where all computer systems can post information and have that information associated with a username. This information can then be accessed by other computer systems. Storage 40 will be referred to as Bulletin Board. In some embodiments, Bulletin Board would be a website designed specifically to host boards or discussions. In other embodiments, Bulletin Board would be an email thread with all the necessary parties included. Bulletin Board could also be implemented on a public ledger system such as blockchain. Central must pick during "Select Recognizable Username 11" a username that will publicly identify him. This username should be communicated to all Nodes before the set up rounds (Steps 102 and 104) are performed. During "Select Pseudonym 33$x$", Node x or Proxy x will select a pseudonym that will be the same throughout the entire process, but will not identify them beyond that. Node x or Proxy x should then communicate through Intranet 30$x$ the username to Central. Node x and Proxy x share the same pseudonym, but no computer system beyond those two may share that pseudonym. No computer has delete privileges on Bulletin Board, so no computer system may remove information they have previously posted.

Figure 4:
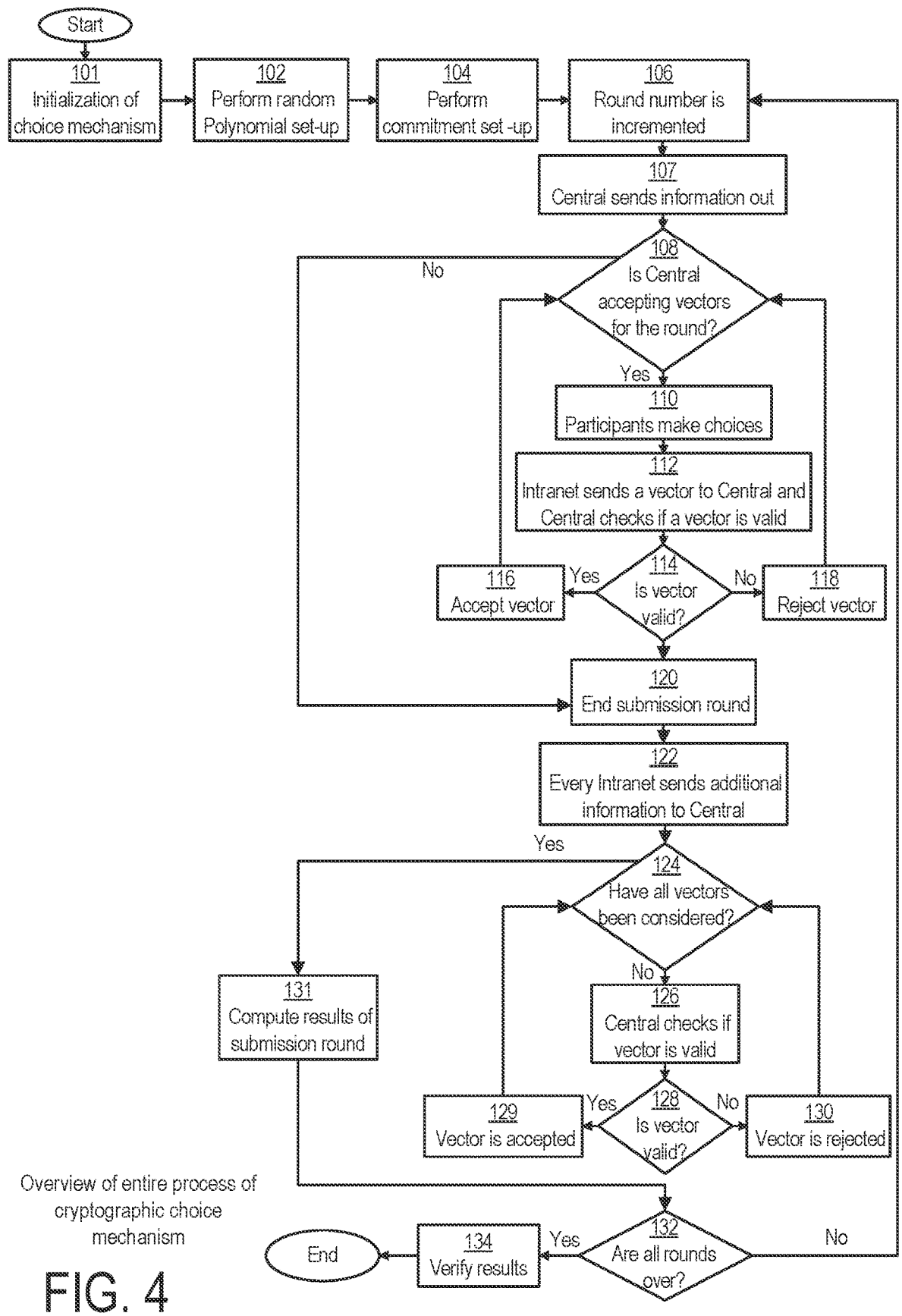
FIG. 4 is a flow diagram providing an overview of an entire process in accordance with one embodiment of the invention.

FIG. 4 shows a broad outline of the entire process. The process begins with Step 101, in which the choice mechanism is initialized. In one preferred embodiment, memory locations accessible only by Central are initialized with one or more sets representing candidates (for a voting mechanism), schools (for a school choice mechanism), or types of items available and their respective quantities (for an auction mechanism), i.e., the sets over which choices are expressed. Optionally, this information is also transmitted to the Bulletin Board. Initialization may also include information about participants, such as the participants eligible to vote for each set of candidates or the participants eligible to bid for each type of item in an auction. Initialization may further include other pertinent information, such as the formulaic preferences of the schools (for a school choice mechanism) or the starting prices and reserve prices (for an auction mechanism). In Step 102, the random polynomial used to compare values with zero knowledge is set up. (This will be described in detail in FIG. 5.) The parameters necessary for the Fujisaki-Okamoto commitment scheme are set up next in Step 104. (This will be described in detail in FIG. 6.) The round number is incremented in Step 106. If this is the first round, the round number is set equal to one here. Central begins each round by transmitting information to Bulletin Board in Step 107. For all x, Central also sends Intranet 30$x$ polynomial encoded values so that Proxy x can execute comparisons without knowing the values compared. In embodiments applied to auctions, the information placed on Bulletin Board could be clock prices for different items in an auction and the values sent to the Intranets could be polynomial encoded clock prices. In embodiments applied to voting, the information submitted to the board could be which choice is eliminated and the values sent to the Intranets could be polynomial encoded values of a vote on each choice. Note that, in Steps 107 to 132, information will be sent through the intranets. In Step 108, Central checks if it is still accepting new vectors for processing. If it is not, the process skips to Step 120. Otherwise, the process continues to Step 110, where participants make submissions expressing choices as required by the choice mechanism. At this step, participants in a plurality voting mechanism select candidates from sets of candidates. Participants in an instant-runoff voting mechanism indicate their rankings of candidates from sets of candidates. Participants in a school choice mechanism indicate their rankings of schools from the set of schools. Participants in a simultaneous multiple round auction indicate pairs comprising specific items from the set of items and associated prices. Participants in a clock auction mechanism indicate quantities of each available type of item at the clock prices. If a participant has already submitted advance instructions in a prior submission period, it may be optional whether the participant makes a submission in the current submission period. Next, the process proceeds to Step 112, in which one or more intranets send a vector to Central and Central checks whether a vector is valid. Central considers each vector independently of all other vectors in Step 112 and checks whether the vector satisfies one or more constraints on the choices. The constraints to be validated against depend on the particular type of choice mechanism and the exact rules (see FIGS. 8$a$, 8$b$ and 8$c$). Note that, at Step 112, the choices expressed within a participant's submission are received by Central in encrypted form and that Central's validation of the submission against constraints occurs while said choices are in encrypted form. In other words, Central may be validating that a participant has submitted valid choices without Central actually knowing what these choices are! Step 114 is a command flow statement that junctions based on whether the vector considered is valid. If Central verifies that the vector is valid, it accepts the vector by going to Step 116. Otherwise it rejects the vector and informs the Intranet 30$x$ that sent the particular vector that it rejected the vector during Step 118. Central will also ignore that vector in future steps. If no valid vector is sent in, then that particular Intranet 30$x$ may be ignored or the last valid vector it sent in, from any round, may be used as the current vector. Step 120, the end of the submission round, occurs at a time announced by Central on Bulletin Board when the round ends and Central stops considering new vectors.

Figure 10A:
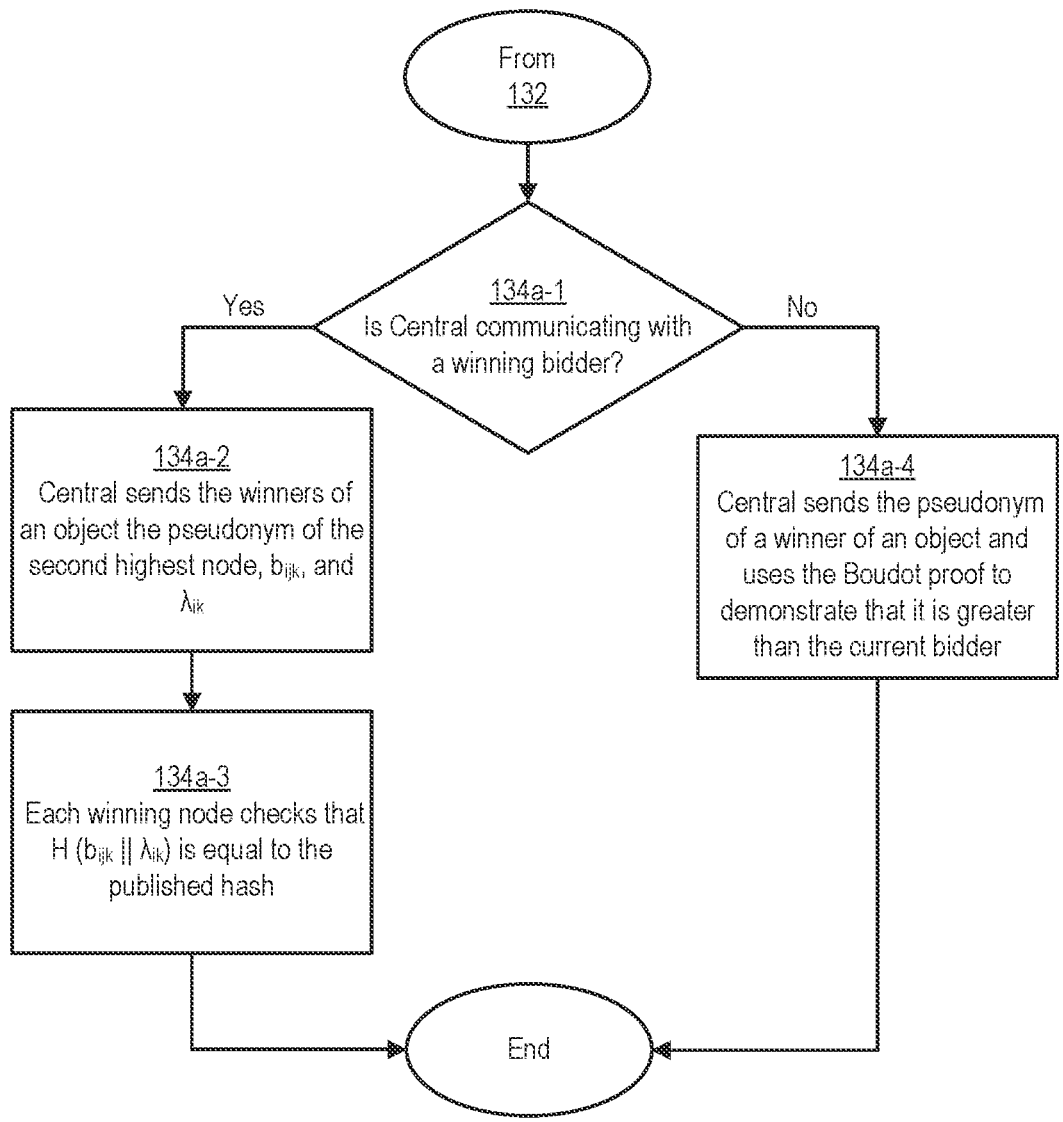
FIGS. 10a and 10b are flow diagrams illustrating, in greater detail, elements of the flow diagram of FIG. 4.
Figure 10B:
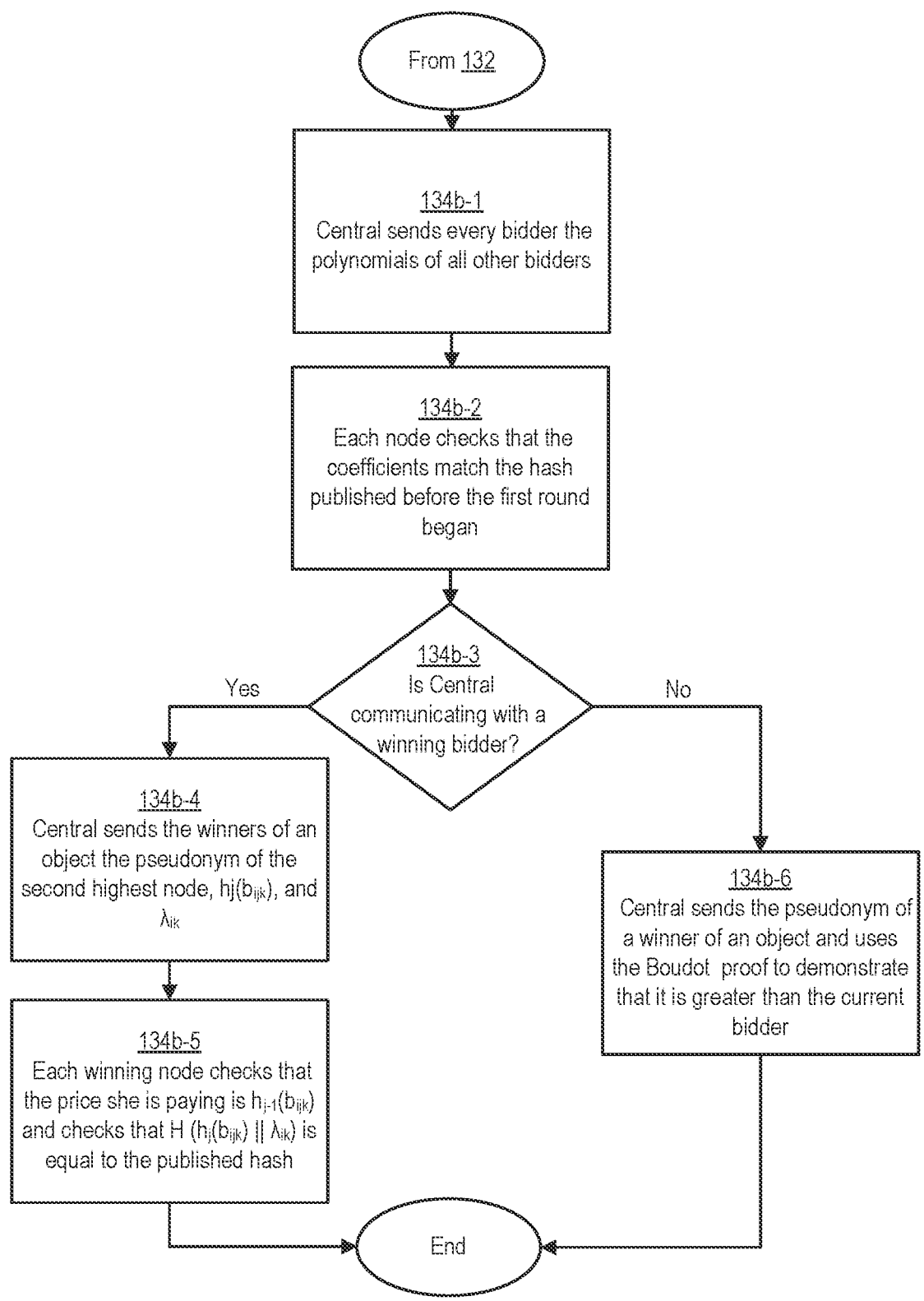
Figure 11A:
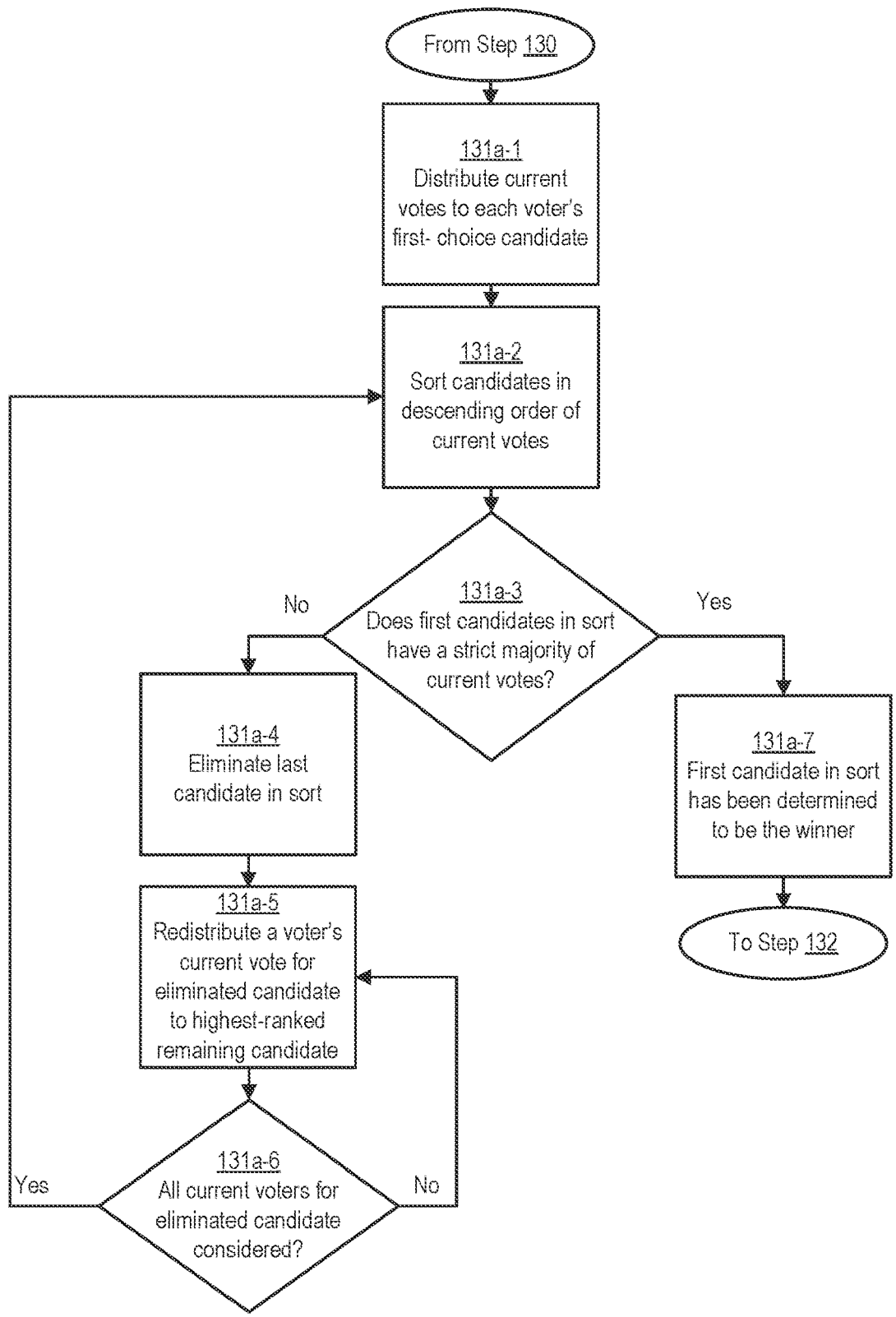
FIGS. 11a, 11b and 11c are flow diagrams illustrating, in greater detail, elements of the flow diagram of FIG. 4.
Figure 11B:
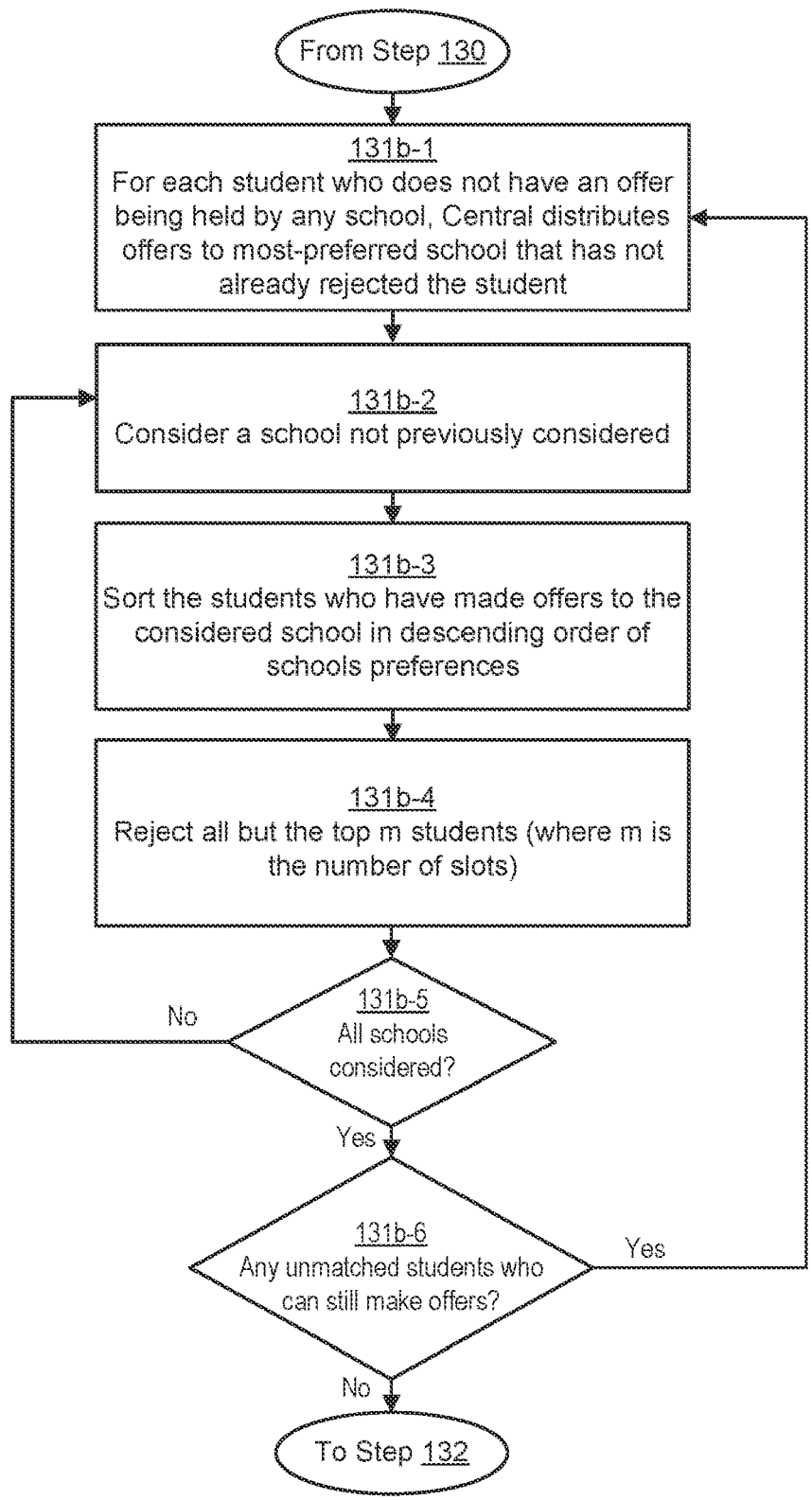
Figure 11C:
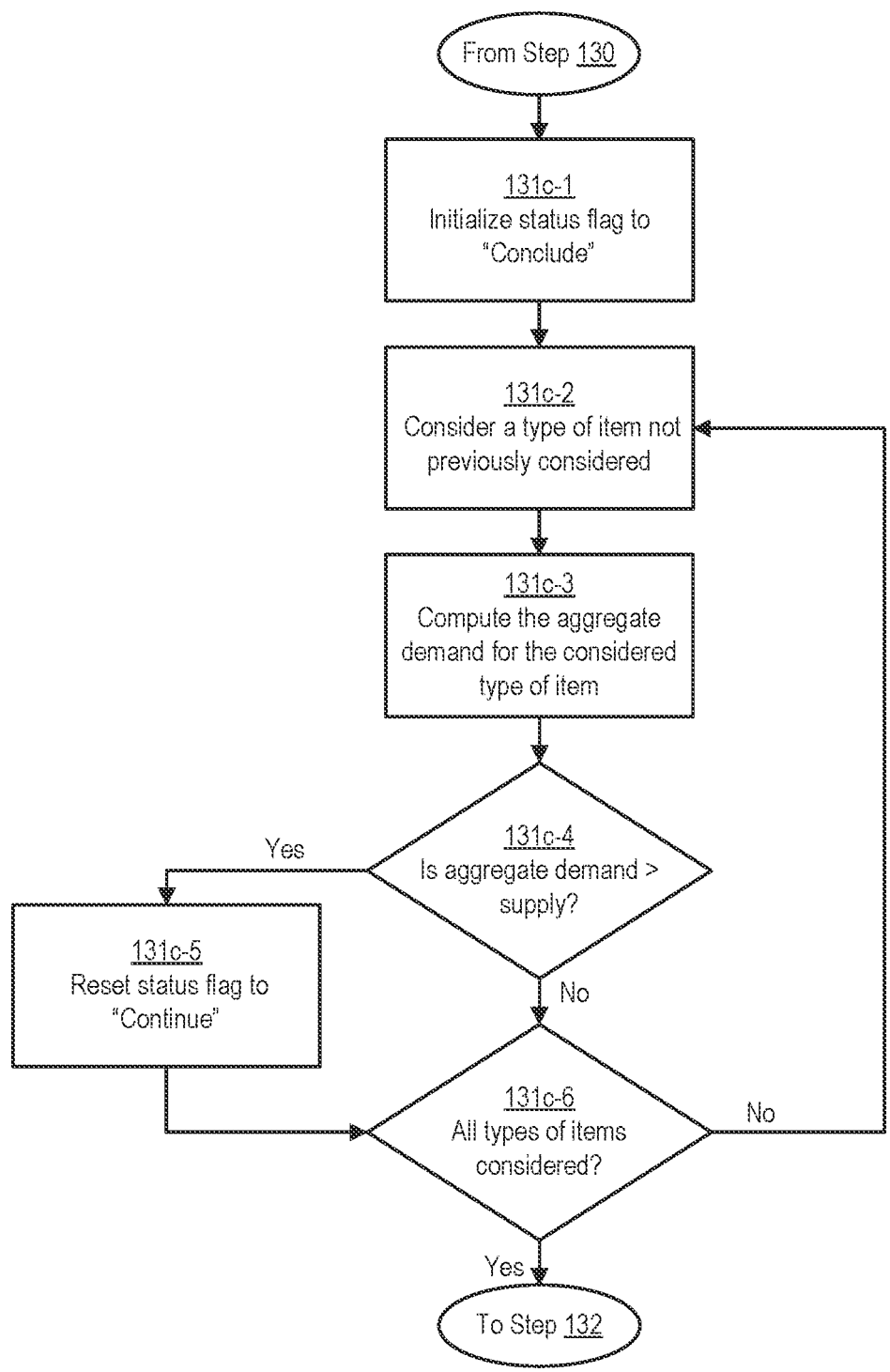

In Step 122, each Intranet 30$x$ sends an additional vector of information to Central in order to further verify the information sent during the round. Additional information is required because near perfect privacy is granted during the round, but in order to be able to conclude the process, more information must be revealed by Intranet 30$x$ to Central. Step 124 considers whether all vectors sent in Step 122 have been processed by Central yet. If they all have, the process goes to Step 131. Otherwise, the process proceeds to Step 126. In Step 126, Central checks whether the after round vector of Step 122 verifies the information sent during the round at Step 112. (This will be described in detail in FIGS. 9$a$, 9$b$ and 9$c$.) Step 128 is a control flow statement that goes to Step 129 if the after round vector is valid and goes to Step 130 otherwise. If Central accepts the vector, then in some preferred embodiments it posts that the vector has been accepted on Bulletin Board during Step 129 and uses the information supplied in the overall process. If Central rejects the vector, then in some preferred embodiments it posts that the vector has been rejected on Bulletin Board during Step 130. If no post-round vector was sent by Intranet 30$x$ then Computer 10 disqualifies Intranet 30$x$ in a similar manner to Step 130. Once all new vectors have been considered, the process continues to Step 131, where the results of the submission round are computed. In embodiments relating to voting, this could mean that all accepted votes are tabulated and the winner(s) are determined. (FIG. 11$a$ provides further detail of an exemplary Step 131 for a voting mechanism.) In embodiments relating to school choice, this could mean processing all accepted ranked lists of students, in combination with the school's formulaic preferences, and determining which students are assigned to each school. (FIG. 11$b$ provides further detail of an exemplary Step 131 for a school choice mechanism.) In embodiments relating to auctions, this could mean determining the aggregate demand for each type of item and comparing it to the available supply. (FIG. 11c provides further detail of an exemplary Step 131 for an auction mechanism.) The process next proceeds to Step 132, where it is determined whether a new submission round should begin. If a new submission round should begin, the process returns to Step 106. Otherwise, the process proceeds to Step 134. In some preferred embodiments, the determination of whether all rounds are over depends on the results of Step 131. For example, in some embodiments relating to auctions, the process continues to a new round if the aggregate demand computed at Step 131 exceeds the available supply for at least one type of item, and all rounds are over if the aggregate demand does not exceed the available supply for any type of item. However, in other preferred embodiments, the number of submission rounds is predetermined. In Step 134, the results of the process are verified. (This will be described in detail in FIGS. 10a and 10b.)

In some embodiments of the invention, only a single submission round is used. For example, many voting mechanisms have only one round of voting. Steps 108 through 132 are still completed in the analogous way as if there were multiple rounds. Alternatively, the end of the first submission round in this case could be taken to be the end of early or absentee voting, and the end of the second submission round could be taken to be the time when polls close and the remaining votes are counted. Other uses and embodiments using one round are also possible.

Secure Advance Instructions and the Random Polynomial Setup Process

A proxy allows a node to execute an action in a choice mechanism without the node having to repeatedly declare its next action. By using an intranet, Central also cannot distinguish between a proxy and a node and therefore does not know if a node is submitting its choices in real time or if advance instructions are being executed by a proxy. Moreover, random polynomials are used to allow a proxy to execute instructions without knowing what those instructions are.

Figure 5:
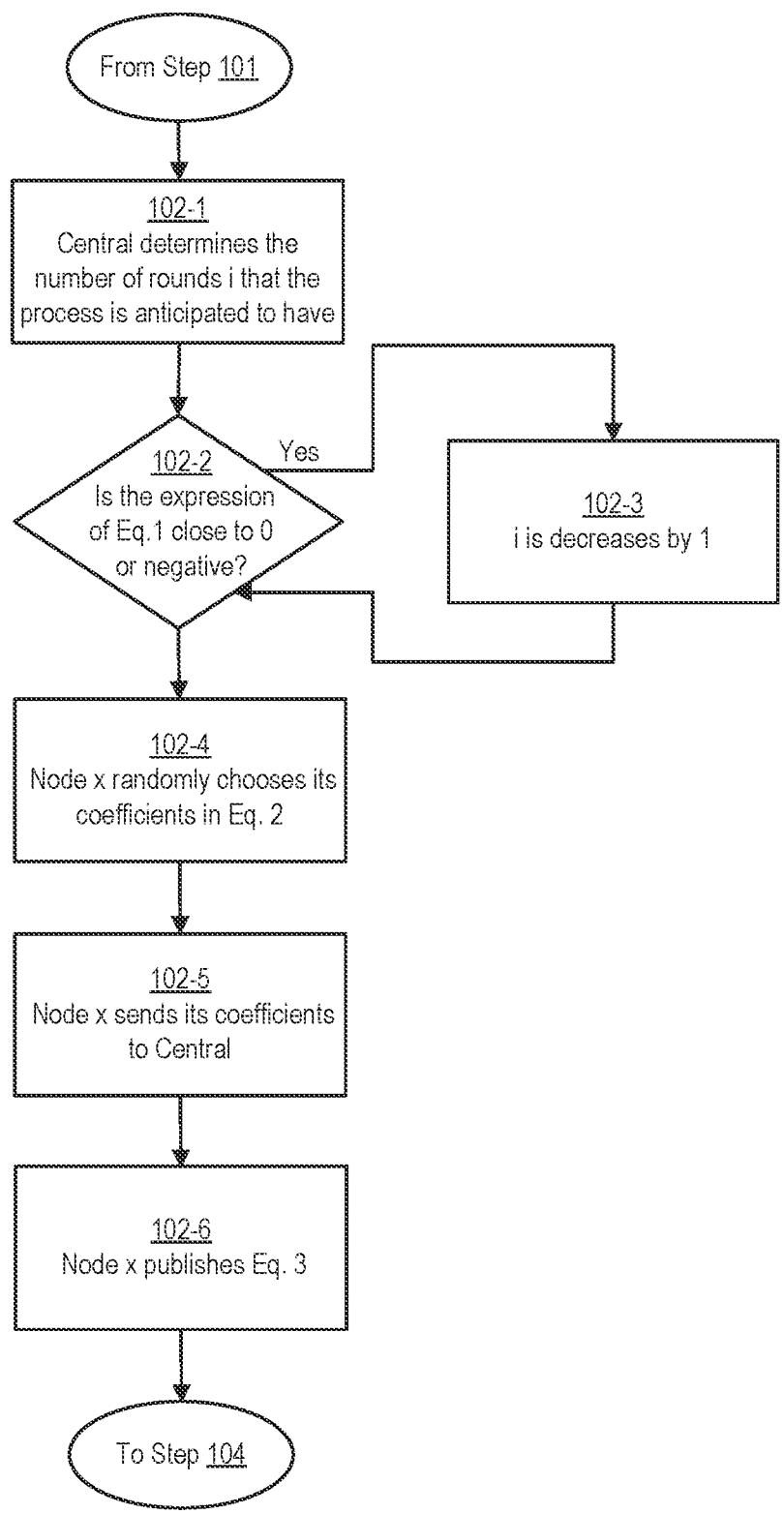
FIG. 5 is a flow diagram illustrating, in greater detail, an element of the flow diagram of FIG. 4.

FIG. 5 details Step 102, the random polynomial setup process. In Step 102-1, Central estimates the value l that it believes will be the maximum number of rounds that the process will go for. Central then checks if $$\frac{|N|}{2} - s_0 - s_1 - 2 - l(|b| + s_2)$$

(Eq. 1) is close to 0 or negative in Step 102-2. N is the modulus used for the Fujisaki-Okamoto commitment scheme, $s_0$ is a security parameter, $s_1$ is a different security parameter, $s_2$ is a third security parameter, and b is the maximum acceptable value for an input. If the calculated value is too small, l is decreased in Step 102-3 until the value is sufficiently large that a modern computer cannot perform the value calculated number of iterations. For all x, Node x then creates an l-th degree polynomial of the form $h(b_j)=a_{j0}(b_j)^l+a_{j1}(b_j)^{l-1}+\ldots+a_{j(l-1)}(b_j)+a_{jl}$ for each object j. In Step 102-4, Node x chooses the coefficients for all its polynomials by randomly assigning coefficient $a_{jt} \in \{0, \ldots, \lfloor 2^{N/2-s_0-s_1-2-(l-t)(|b|+s_2)}/l \rfloor\}$ (Eq. 2). In some embodiments, the objects would be the items being sold in an auction. In Step 102-5, Node x sends Central the coefficients generated. Then in Step 102-6, Node x publishes $H(a_{00}\|a_{01}\| \ldots \|a_{ml})$ (Eq. 3) to Bulletin Board. H represents a cryptographic hash function, $\|$ represents concatenation, and m is the total number of objects. Examples of cryptographically secure hash functions include, but are not limited to, SHA-256 and SHA-512. In order for the setup to be complete, Central must verify on Bulletin Board that the coefficients sent to Central by Node x match what Node x published.

The Fujisaki-Okamoto Commitment Scheme Setup Process

Figure 6:
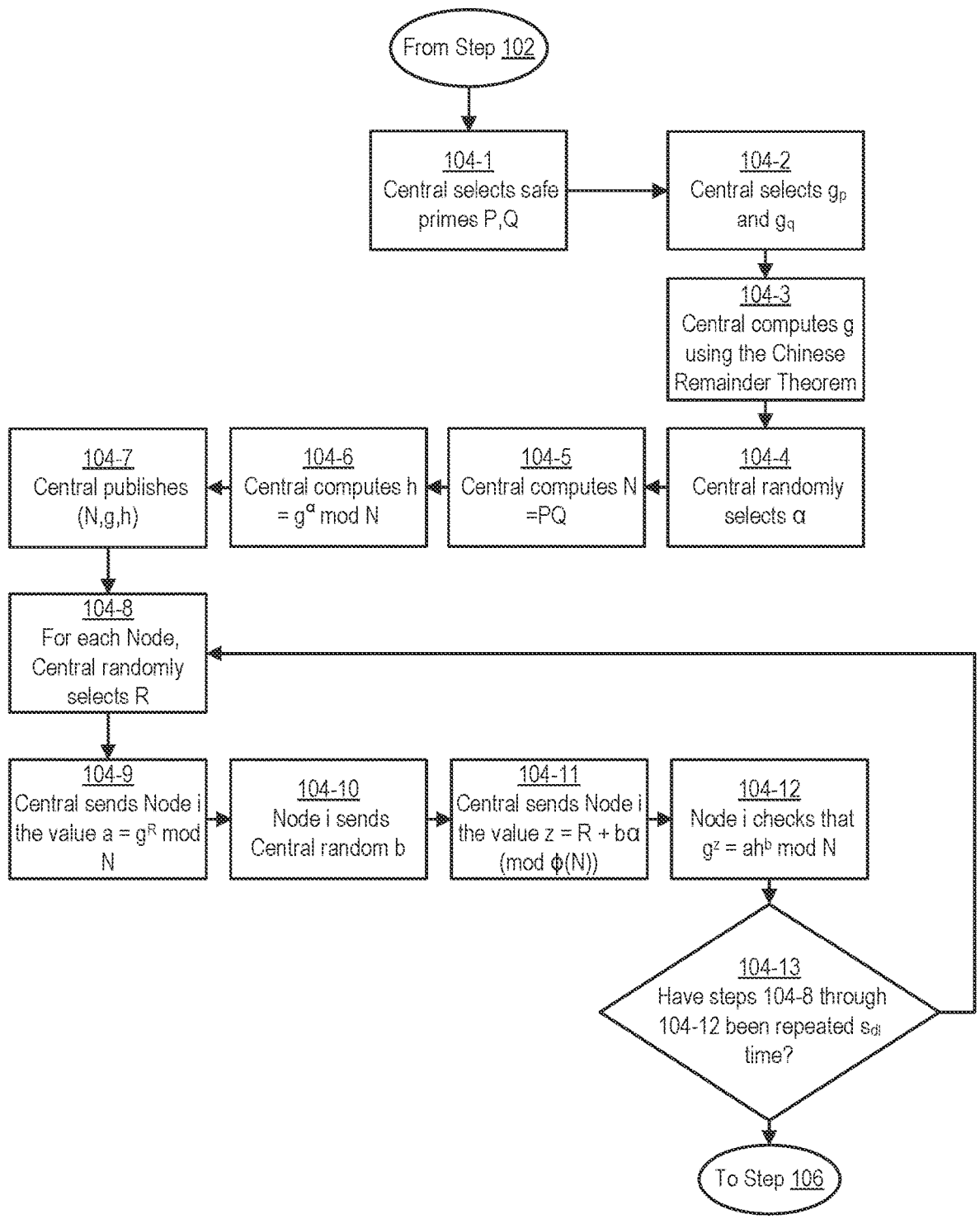
FIG. 6 is a flow diagram illustrating, in greater detail, an element of the flow diagram of FIG. 4.

FIG. 6 details step 104, the setting up of the Fujisaki-Okamoto commitment scheme. In Step 104-1, Central selects two large, unpredictable safe primes P, Q. This means that $p=(P-1)/2$ and $q=(Q-1)/2$ are both prime. In Step 104-2, Central selects $g_p \in \{2, \ldots, P\}$ such that $(g_p)^p=1$ mod P and $g_q \in \{2, \ldots, Q\}$ such that $(g_q)^q=1$ mod Q. Central is then able to create a generator over PQ by using the Chinese Remainder Theorem to calculate g from $g=g_p$ mod P and $g=g_q$ mod Q in Step 104-3. In Step 104-4, Central chooses a random $\alpha \in \{1, \ldots, p_q\}$. Central computes $N=PQ$ in Step 104-5. Central then calculates $h=g^\alpha$ mod N in Step 104-6. Finally, in Step 104-7, Central posts N, g, and h to Bulletin Board. Next, Central must prove to every Node x that it knows $\alpha$ such that $h=g^\alpha$ mod N. To do this, a zero-knowledge proof created by Chaum et al. is used in Steps 104-8 through 104-13. In Step 104-8, Central randomly selects $R \in \{1, \ldots, p_q\}$. In Step 104-9, Central then sends that Node x $a=g^R$ mod N. In Step 104-10, Node x sends back a random bit $b \in \{0,1\}$. In Step 104-11, Central sends back to Node x the value $z=R+b\alpha$ mod $\phi(N)$. In Step 104-12, Node x checks that $g^z=ah^b$ mod N. The chance that Central could generate a valid z for this check without knowing $\alpha$ is ½. Steps 104-8 through 104-12 are repeated $s_{dl}$ times in order to prove that there is greater than $1-2^{s_{dl}}$ chance that Central knows $\alpha$. If these steps have not been repeated $s_{dl}$ times, then Step 104-13 proceeds to Step 104-8, otherwise the process proceeds to Step 106.

Random Permutations

Figure 7:
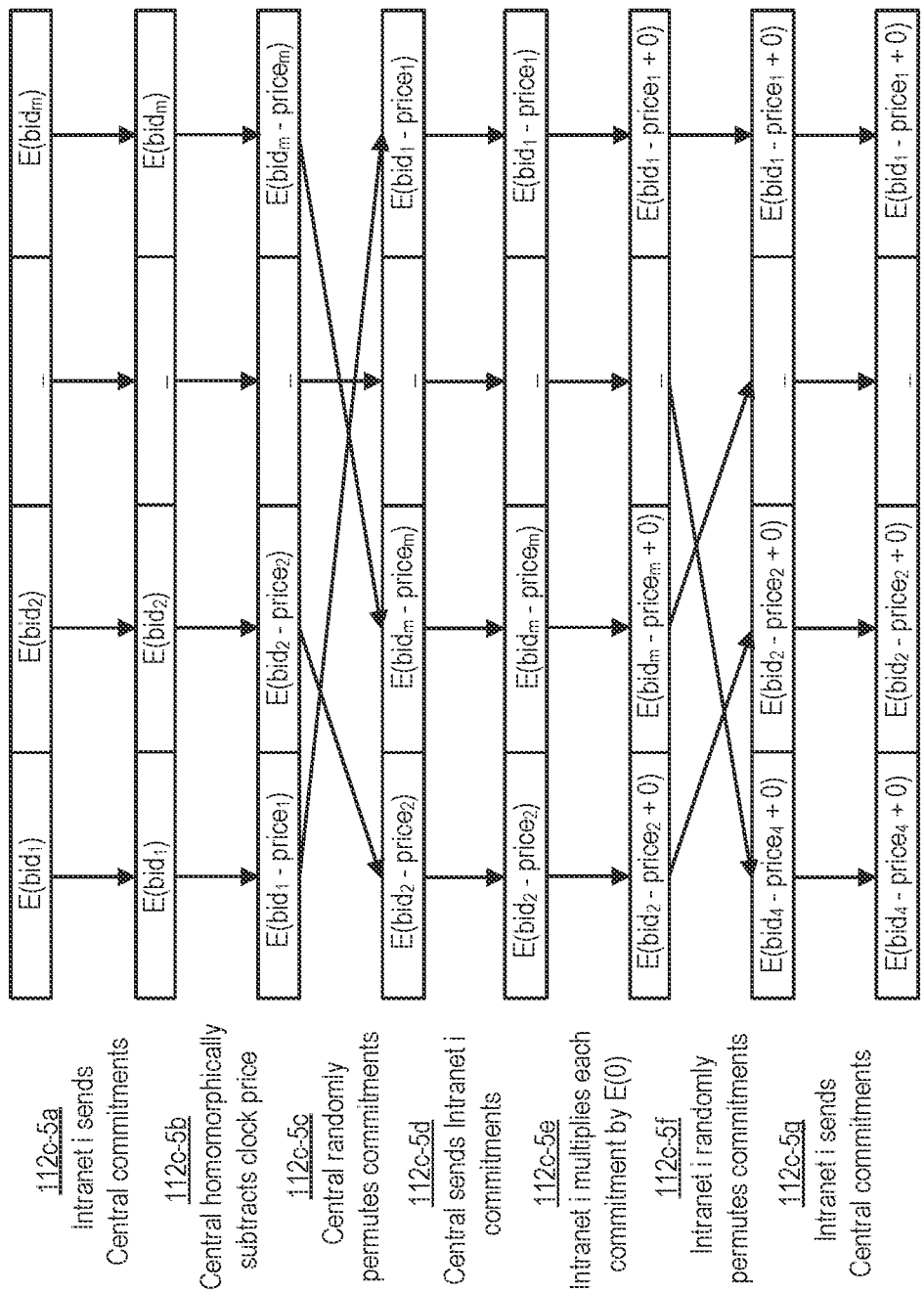
FIG. 7 is a flow diagram illustrating, in detail, a random permutation process in accordance with one embodiment of the invention.

Random permutations are used during a submission round in order for Central to validate that a submission by Intranet 30x satisfies one or more constraints required by the choice mechanism, without any other information being revealed. FIG. 7 describes in detail the random permutation process, which is referenced for example in Steps 112c-5 below. This permutation process begins with Intranet 30x sending a commitment to each bid to Central in Step 112c-5a. In Step 112c-5b, once Central receives the commitments, it uses the homomorphic properties of the Fujisaki-Okamoto commitment scheme to subtract the clock prices without knowing what the bids actually are. In Step 112c-5c, Central randomly permutes the commitments. Central must store the permutation because it must be sent to Intranet 30x in Step 112c-6. In Step 112c-5d, Central sends Intranet 30x the now permuted commitments. In Step 112c-5e, Intranet 30x masks the commitments by adding zero homomorphically. By mask, what is meant is that by adding zero homomorphically, it is impossible to figure which commitments before the masking match with which commitments after the masking if either set is permuted. In Step 112c-5f, Intranet 30x permutes the masked commitments. Finally, in Step 112c-5g, Intranet 30x sends Central the permuted, masked commitments. At this point in the process, neither Intranet 30x nor Central knows which commitment is associated with which items.

Applications of Random Permutation to Static Mechanisms

Figure 8A:
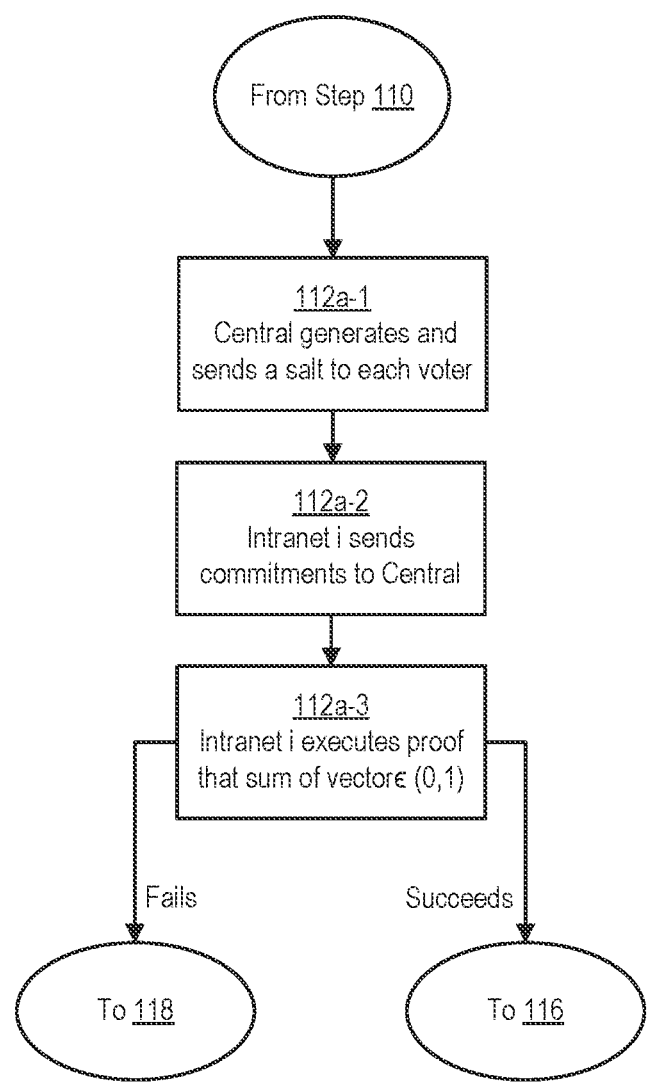
FIGS. 8a, 8b and 8c are flow diagrams illustrating, in greater detail, elements of the flow diagram of FIG. 4.

A ranked choice voting mechanism involves every voter ranking each candidate from 1 to the number of possible choices. In the version known as instant-runoff voting, the candidate with the fewest numbers of votes is eliminated in each round and all votes selected for that choices are spread out among the rest of the possible candidates by selecting the next favorite candidate on each voter's list. FIG. 8a details an embodiment of Step 112 by which Central checks that a vector is valid during a round for embodiments of the invention that apply to ranked choice voting. First, for all x, Central sends Intranet 30x a random number in $\{1, \ldots, 2^{s_{salt}}\}$ where $s_{salt}$ is a security parameter in Step 112a-1. That random number is known as the salt which will be appended to the value being hashed after the round. In this embodiment, the salt is sent during the round to allow Intranet 30x to calculate (while the round is still going on) the hash that will be needed after the round. Intranet 30x then sends Central a commitment to its vote in Step 112a-2. If Proxy x is calculating the commitments as opposed to Node x it must use the information Central sent to Intranet 30x in Step 108. It uses this information to figure out which choice is being voted for. The commitment takes the form of a commitment to 0 for all choices that are not voted for and 1 for the choice that is being voted for. Because the Fujisaki-Okamoto commitment scheme is homomorphically additive, Intranet 30x can prove that the sum of all commitments is less than or equal to 1 by proving using the Boudot proof that the sum is in [0,1]. The Boudot proof is executed in Step 112a-3. If the proof fails, the process goes to Step 118. If the proof succeeds, the process goes to Step 116.

Figure 9A:
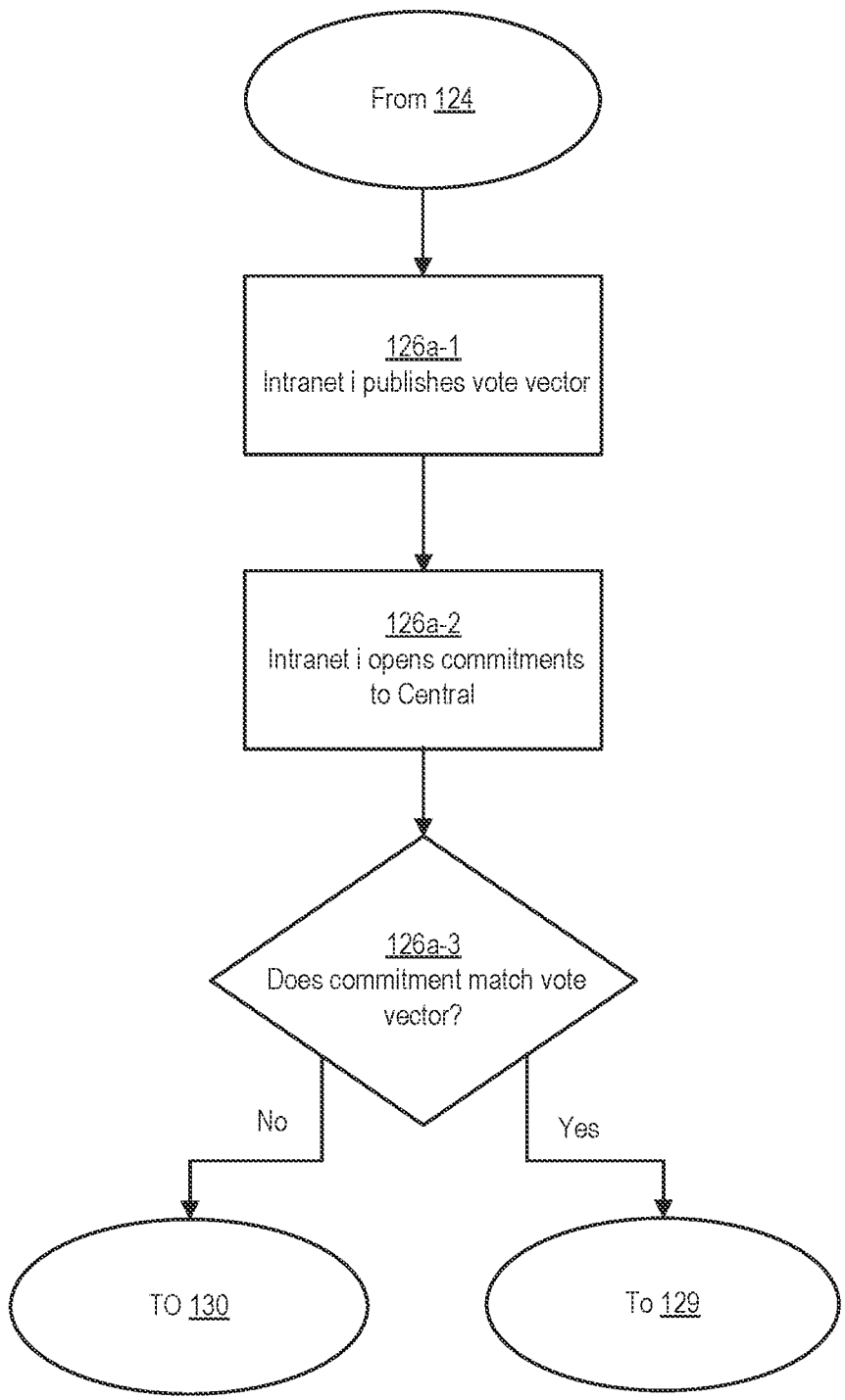
FIGS. 9a, 9b and 9c are flow diagrams illustrating, in greater detail, elements of the flow diagram of FIG. 4.

FIG. 9a details an example verification process by which Central checks that a vector is valid after a submission round, for an exemplary embodiment of a voting mechanism. For all x, Intranet 30x publishes its vote vector to Bulletin Board during Step 126a-1. In Step 126a-2, Intranet 30x then opens all the commitments they sent during the round to Central. In Step 126a-3, Central checks if the published vector matches the expected vector from the submission round. Central also checks that the commitments were successfully and correctly opened. If both of these conditions hold, the process proceeds to Step 129; otherwise it proceeds to Step 130. Once all vectors have been considered from the submission round, the results of the submission round are computed in Step 131, which will be detailed for an exemplary voting mechanism in FIG. 11a.

In some embodiments, multiple choices may be allowed to be selected in any given submission round. For example, in some elections, voters may be allowed to vote for N>1 candidates—and N>1 winners may be selected from each voting district. In those embodiments, Step 112a-3 would be modified so that the Boudot proof would be used to prove that the sum is between 0 and the maximum number of possible choices. After the round is over and all vectors have been considered, the choice with the fewest number of votes is still eliminated. The mechanism goes to Step 134 once the number of choices that need to be selected is the same as choices that have not been eliminated.

In some embodiments, a plurality voting mechanism is used. Plurality voting means that in the first round the N choices with the highest number of votes are selected. These embodiments are very similar to the ones in the above paragraph, but there is only one submission round and after that round the choices receiving the most votes are the winners.

In other embodiments of the invention, the random permutations are applied to school choice. In these embodiments, every school has formulaic preferences over students (which Central knows), and every student has a ranking over all schools (which Node x knows, but Central does not). For a student's choice to be valid, the student must indicate one first choice, one second, etc.

Figure 8B:
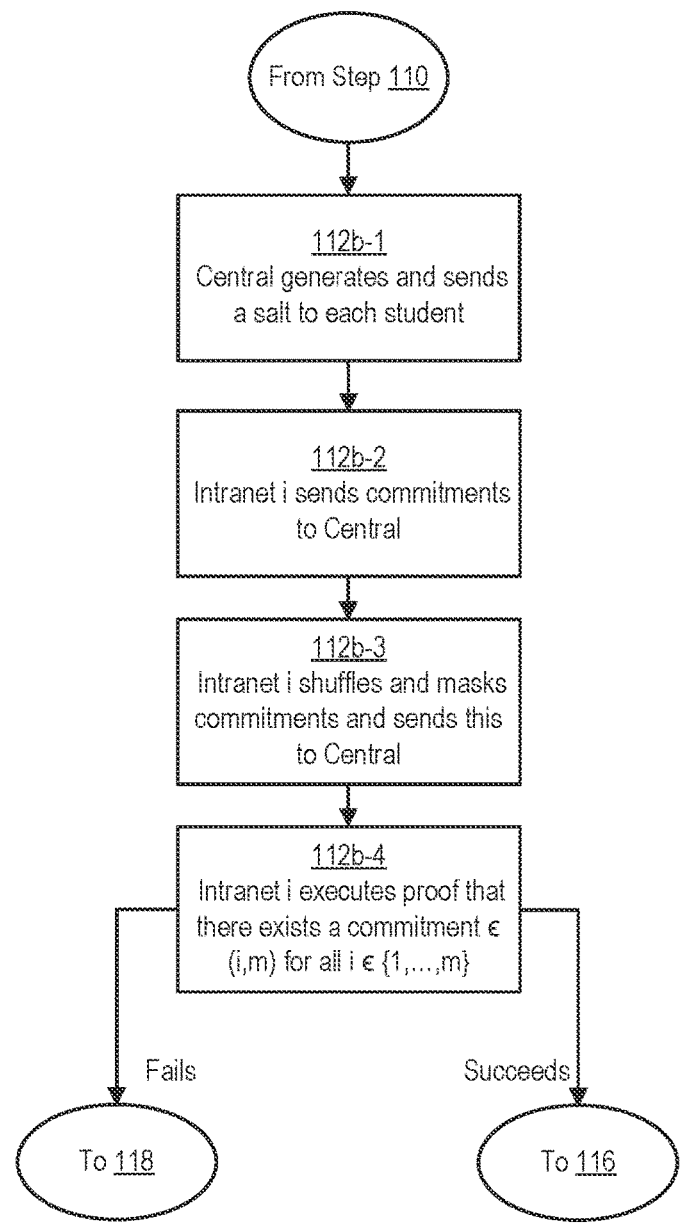

FIG. 8b details an example embodiment of Step 112 by which it is checked during a round that a vector is valid, for an exemplary embodiment of a school choice mechanism. In Step 112b-1, for all x, Central sends Intranet 30x a random number in $\{1, \ldots, 2^{s_{salt}}\}$ where $s_{salt}$ is a security parameter. That random number is known as the salt, which will be appended to the value being hashed after the round. In this embodiment, the salt is sent during the round to allow Intranet 30x to calculate (while the round is still going on) the hash that will be needed after the round. Intranet 30x then sends Central a commitment to its school ranking in Step 112b-2. If Proxy x (as opposed to Node x) is calculating the commitments, it uses the information Central sent Intranet 30x in Step 108. It uses this information to figure out which ranking is being selected. The commitment takes the form of a commitment to 1 for the first choice, 2 for the second choice, and so on for all choices. In Step 112b-3, Intranet 30x shuffles the commitments and then masks each commitment by homomorphically adding 0. This transformed vector is also sent to Central, but provides it no information on the preference order. In Step 112b-4, Intranet 30x opens all of its transformed commitments to prove that every rank between 1 and the number of choices has been included in the submission (i.e., that the ranking is a permutation of the schools). If the proof fails, the process goes to Step 118; if the proof succeeds, the process goes to Step 116.

Figure 9B:
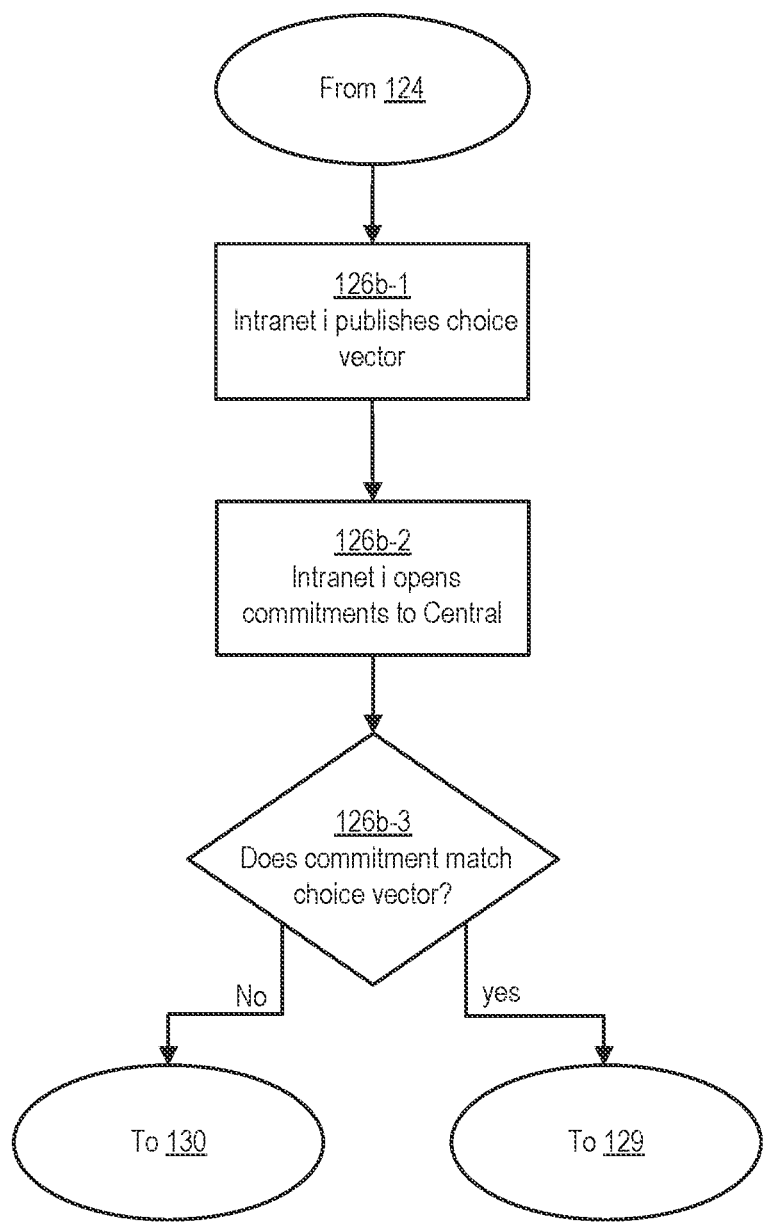

FIG. 9b details an example verification process after the submission round ends, for an exemplary embodiment of a school choice mechanism. First, all Intranet 30x publish their choice vectors to Bulletin Board in Step 126b-1. Then, in Step 126b-2, Intranet 30x open their commitments for all preferences that they sent during the submission round to Central. In Step 126b-3, Central checks if the published vectors match the expected vectors from the submission round. Central also checks that the commitments were successfully and correctly opened. If both of these conditions hold, the process proceeds to Step 129; otherwise it proceeds to Step 130. Once all vectors have been considered from the submission round, Central knows the participants' rankings and can compute the results of the submission round in Step 131, which will be detailed for an exemplary school choice mechanism in FIG. 11b.

Applications of Random Permutation to Dynamic Mechanisms

Figure 8C:
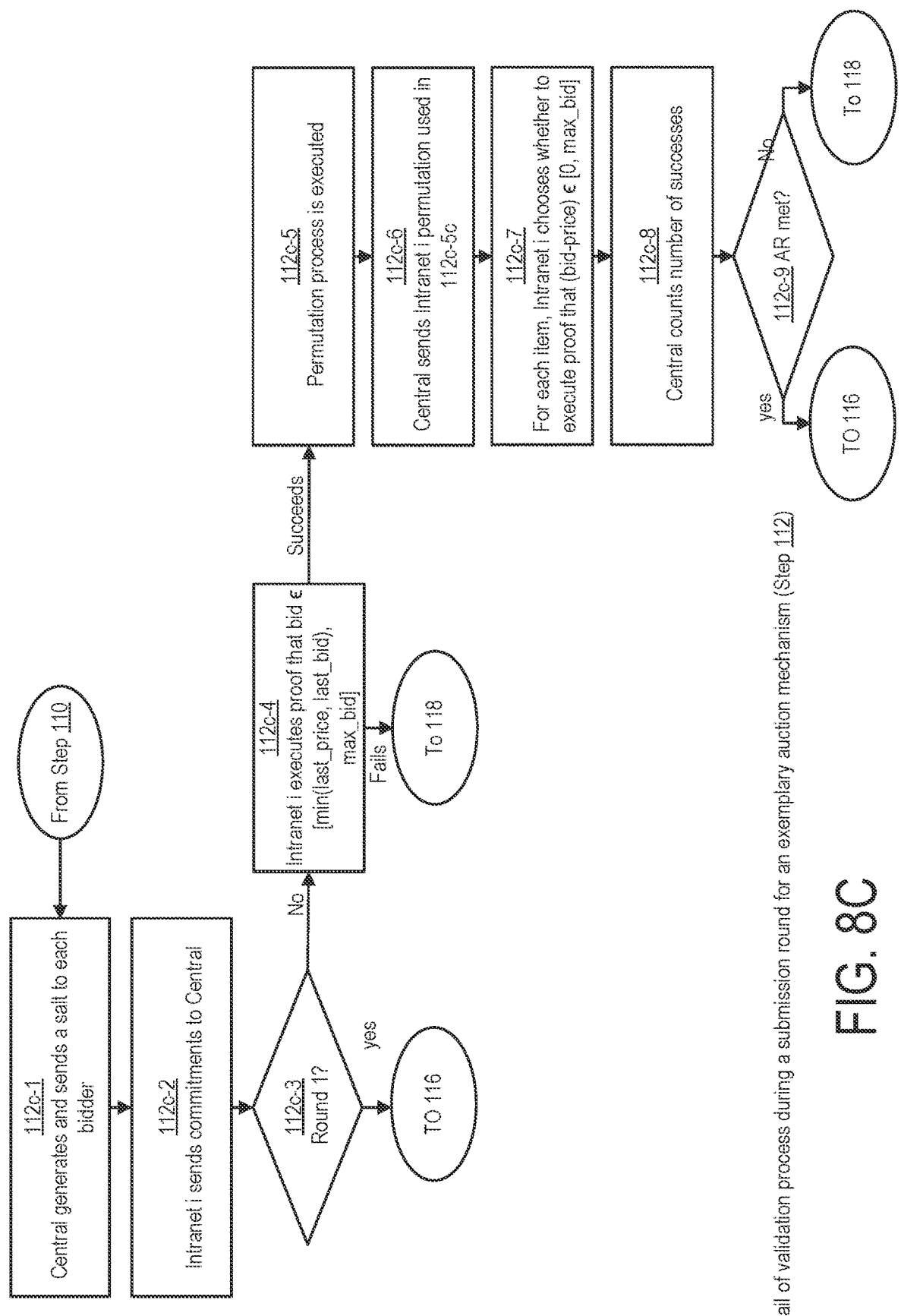

FIG. 8c details an embodiment of Step 112 by which Central checks that a vector is valid during a submission round for embodiments of the invention that apply to auctions. This embodiment enforces a simple activity rule in which every item is assigned the same number of points and the number of points included in the participant's bid is required to be non-increasing from each round to the next. In this embodiment, the identities of the particular items that are receiving the participant's bids will be encrypted and inaccessible to Central during the submission round. Nonetheless, Central will be able to validate that the bid submission complies with the activity rule. Other embodiments can also handle scenarios where different items are assigned different numbers of points and the number of points included in the participant's bid is required to be non-increasing from each round to the next. First, in Step 112c-1, for all x, Central sends Intranet 30x a random number in $\{1, \ldots, 2^{s_{salt}}\}$ where $s_{salt}$ is a security parameter. That random number is known as the salt which will be appended to the value being hashed after the round. In this embodiment, the salt is sent during the round to allow Intranet 30x to calculate (while the round is still going on) the hash that will be needed after the round. In Step 112c-2, Intranet 30x then sends Central a commitment for every item. This commitment is a Fujisaki-Okamoto commitment and is of the form $g^c h^r$ mod N where c is the value that is being committed to, r is a random helper value in $\{-2^{s_r} N+1, \ldots, 2^{s_r} N-1\}$ that prevents Central from deducing x from the commitment, and $s_r$ is the security parameter for the helper value. If it is round 1, Central accepts the bid without any further interaction with Intranet 30x by going from Step 112c-3 to Step 116. Otherwise, the process proceeds from Step 112c-3 to Step 112c-4. Intranet 30x must execute a Boudot proof for each item to prove that the bid is between the minimum of the clock price from the previous round and bid from the previous round and the maximum possible bid. All these values (bid, clock price, and maximum bid) are encoded with the random polynomial so that Proxy x could execute the proof without knowing what the bids are. This proof in effect proves that the current bid is greater than or equal to the minimum of the last clock price and the last bid. If the proof fails, then the process proceeds to Step 118. If it succeeds, then a permutation process is executed to prevent Intranet 30x and Central from knowing which commitments are associated with which items in Step 112c-5 (FIG. 7). The permutation process also causes commitments to be to the difference between the bids and the clock prices as opposed to the bids themselves. Central sends Intranet 30x the permutation it used in Step 112c-5c during Step 112c-6. This allows Intranet 30x to know which bids are associated with which items and complete more Boudot proofs in Step 112c-7. In Step 112c-7, Intranet 30x completes a Boudot proof that the new commitments are between 0 and the maximum bid for as many commitments as it can. Central counts the number of proofs that succeed in Step 112c-8 and uses that to check if the activity rule is met in Step 112c-9. In some embodiments, the activity rule is whether the number of proofs that succeed in any given round is greater than or equal to the number of bids that were greater than or equal to the clock price in the previous round. In other embodiments, there is no activity rule and therefore the activity rule is always met. If the activity rule is met, then the process goes to Step 116. Otherwise, it goes to Step 118. In the embodiments where there is no activity rule, Steps 112c-5 through 112c-9 can be ignored and if the proofs in 112c-4 succeed, the process goes straight to Step 116. While it is possible for Intranet 30x to cheat on the activity rule by pure chance at this moment, it is not possible for Intranet 30x to cheat the activity rule after the round over, so there is no incentive to try and cheat the rule during the round.

Figure 9C:
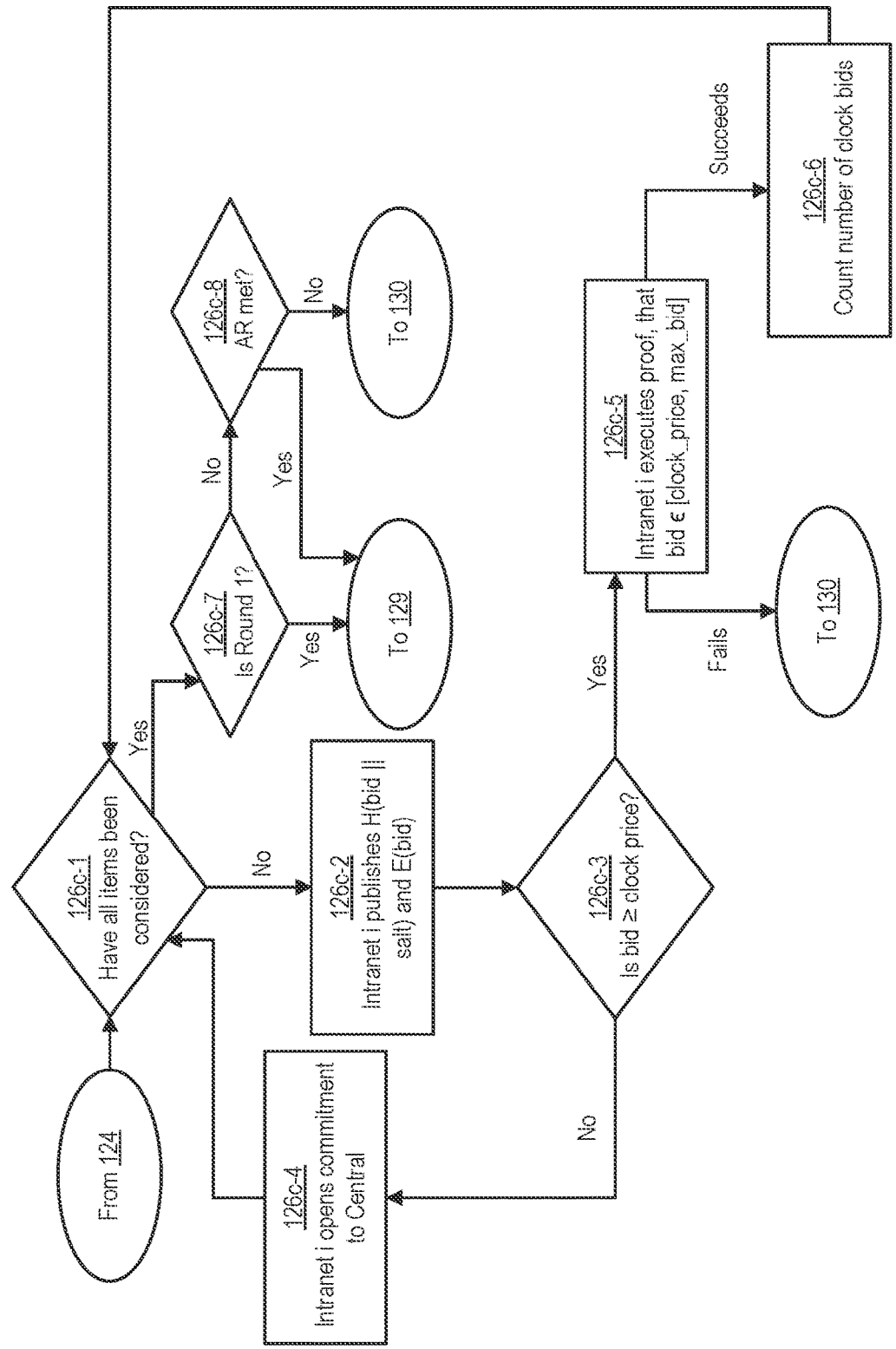

FIG. 9c details an exemplary process by which Central checks if a vector is valid after a submission round, for embodiments of the invention that apply to auctions. Every Intranet 30x is considered independently. Step 126c-1 checks if all items have been considered. If they all have, the process proceeds to Step 126c-7. Otherwise, the process proceeds to 126c-2. Intranet 30x publishes the cryptographically secure hash of a bid with the salt sent to it during the round appended to Bulletin Board during Step 126c-2. It also publishes the commitment to the bid. If the bid for an item is less than the clock price, the process proceeds from Step 126c-3 to Step 126c-4 and Intranet 30x opens the commitment for that bid to Central by sending Central the bid and random helper value used for the commitment. The next item is then considered by going from Step 126c-4 back to Step 126c-1. If the bid was greater than or equal to the clock price, then the process goes from Step 126c-3 to Step 126c-5. In Step 126c-5, Intranet 30x executes a Boudot proof that the bid is between the clock price and the maximum bid, inclusive, which in effect checks if the bid was greater than or equal to the clock price. If the proof fails, the process goes to Step 130. If the proof succeeds, the process goes to Step 126c-6. In that step, Central increments the number of clock bids by one. Steps 126c-1 through 126c-6 are repeated until all items have been considered. Once all items have been considered, the process proceeds to Step 126c-7. If it is round 1, the process goes immediately to Step 129. However, if it is not round 1, then Central must check if the activity rule is met. If the activity rule is met, then the process proceeds to Step 129 is next. If the activity rule is not met, then the process proceeds to Step 130. The activity rule is as described above.

After all submission rounds have been completed, Central can verify the results of the choice mechanism process to any Node x that desires verification. In some embodiments, this verification process is not necessary. For example, in embodiments involving voting, votes are often published after a round is complete and therefore verification is not needed after all rounds are over. FIG. 10a details a process by which Central verifies the results for embodiments of the invention that apply to auctions. The verification process is different for bidders who have won an item and for those that have not. Step 134a-1 is a control flow statement that goes to Step 134a-2 if Central is interacting with Node x that won and goes to Step 134a-4 otherwise. The verification process for winners begins in Step 134a-2 with Central sending the winner or winners of a particular set of items the pseudonym of the highest losing Intranet, the bid, and the salt. In Step 134a-3, the winning Computer checks that the bid matches the price being paid and that the hash published to Bulletin Board matches the hash of the salt appended to the bid. If all these steps are completed successfully, then a winning Node x know that it is paying a fair price. If Steps 134a-2 or 134a-3 fail, then a winning Node x should suspect that it has been cheated and seek recourse against Central. The verification process for losers occurs in Step 134a-4. In this step, Central sends Node x the pseudonym of a winner of an object. It then uses the Boudot proof to prove that this Intranet bid at least as much as Node x. If this step fails, then a losing Node x should suspect that it has been cheated and seek recourse against Central. Once the verification process is completed, the entire process is completed.

Applications of Secure Advance Instructions to Choice Mechanisms

In embodiments where random polynomials are used to allow execution of advance instructions with zero knowledge, the process is largely the same as above, with the only difference being that all values are encoded with a random polynomial that both Node x and Central know, but Proxy x does not.

In embodiments where the choice mechanism is a voting mechanism utilizing instant-runoff voting, a proxy can be used so that a voter's second and subsequent choices are disclosed only to the extent that the voter's higher-ranked choices get eliminated. That is, if a given voter's first choice is the winner (or is never eliminated until the winner is determined), then Central never needs to know the given voter's second and subsequent choices. However, if at a given stage of the processing, the given voter's first choice is eliminated without a winner being determined, Central then needs to learn the given voter's second choice. At this point, the proxy can execute secure advance instructions in order to communicate the voter's second choice to Central.

In embodiments where the choice mechanism is a school choice mechanism using the Gale-Shapley algorithm, a proxy can similarly be used so that a student's second and subsequent choices are disclosed only to the extent that she is not assigned her higher-ranked choices. This follows exactly the same description as for instant-runoff voting in the previous paragraph.

In embodiments where the choice mechanism is a single-item clock auction, a proxy can be used so that a participant can give secure advance instructions to bid up to a bidding limit that is much greater than the current clock price. The participant's bidding limit is disclosed only to the extent that the proxy needs to continue bidding on the participant's behalf, to keep the participant in the auction. For example, if a given participant has given secure advance instructions to bid up to $250,000 but the last opponent dropped out of the auction in a round when the clock price was $130,000, then the bidding would stop at $130,000 and no agent (including Central and the proxy) would ever learn that the participant's bidding limit was $250,000.

In embodiments where the choice mechanism is a multi-unit clock auction, a proxy can be used so that a participant can give secure advance instructions of bidding limits for various quantities of items. As with the single-item clock auction, these thresholds can be much greater than the current clock price and they will be disclosed only to the extent that the proxy needs to continue bidding on the participant's behalf. For example, if a given participant has given secure advance instructions to bid up to $100,000 per unit for four units, up to $150,000 per unit for three units, up to $200,000 per unit for two units, and up to $250,000 per unit for one unit, but if the auction clears in a round when the clock price was $130,000, then the bidding would stop at $130,000 with the given participant winning three units. Central and the proxy would have learned that the given participant's bidding limit for four units was $100,000, since the bid quantity dropped from four to three at a price that was reached. However, no agent (including Central and the proxy) would ever learn that the participant's bidding limit for three units was $150,000, etc.

In embodiments that relate to auctions, a verification process is needed in order to demonstrate to the winning bidder that she is paying a fair price and verify to the losing bidders that they should not have won. FIG. 10$b$ details the process by which Central verifies the results for embodiments of the invention that apply to auctions and use proxies. The verification process begins in Step 134$b$-1 with Central sending Node x all polynomials generated by Node y for all x and for all y not equal to x. In Step 134$b$-2, each Node x checks that the hashes published to Bulletin Board match the polynomial coefficients just received. Step 134$b$-3 is a control flow statement that goes to Step 134$b$-4 if Central is interacting with Node x that won and goes to Step 134$b$-6 otherwise. In Step 134$b$-4, for each item, Central sends Node x the pseudonym of the highest losing Intranet, the polynomial encoded bid and the salt. In Step 134$b$-5, the winning Node x checks that the inverse polynomial of the encoded bid match the price being paid and that the hash published to Bulletin Board matches the hash of the salt appended to the encoded bid. If all these steps are completed successfully, then a winning Node x know that it is paying a fair price. If any of Steps 134$b$-1 through 134$b$-5 fail, then a winning Node x should suspect that it has been cheated and seek recourse against Center. The verification process for losers occurs in Step 134$b$-6. In this step, Central sends Node x the pseudonym of a winner of an object. It then uses the Boudot proof to prove that this Intranet bid at least much as Node x. If any of Steps 134$b$-1, 134$b$-2 or 134$b$-6 fail, then a losing Node x should suspect that it has been cheated and seek recourse against Central. Once the verification process is completed, the entire process is completed.

It should be noted the verification processes, in combination with the encryption processes, described in this document may also be useful in implementing sealed-bid auctions. For example, consider a second-price sealed-bid auction for a single item: the participant who submits the highest bid wins the item, but it pays the amount of the second-highest bid. One reason to use a second-price approach is in order to keep the winning bid secret—if participants know that the winning bid will be kept secret, they may be willing to bid more aggressively than if the winning bid will be disclosed. However, the mechanism needs a way (without publicly disclosing the bids) to: (1) "prove" to the winning participant that it is paying a fair price, i.e., that there was a losing bid corresponding to the price; and to (2) "prove" to the losing participants that they should be losing, i.e., that there was a higher winning bid. As we have seen, the processes described in this document accomplish both of these objectives.

FIG. 11$a$ details the process by which Central computes the results of a submission round (Step 131), for an exemplary embodiment of a voting mechanism. In FIG. 11$a$, the voting mechanism implements instant-runoff voting. The process begins with Step 131$a$-1, in which Central distributes "current votes" to each voter's first-choice candidate. It continues to Step 131$a$-2, in which Central sorts the candidates in descending order of votes. It then proceeds to Step 131$a$-3, in which Central checks if the first candidate in the sort (i.e., the remaining candidate with the most current votes) has a strict majority of all votes cast. If the first candidate has a strict majority, the process proceeds to Step 131$a$-7, in which this candidate is determined to be the winner, and it proceeds to Step 132. Otherwise, the process proceeds to Step 131$a$-4, in which Central eliminates the last candidate in the sort (i.e., the remaining candidate with the fewest current votes). It then proceeds to Step 131$a$-5, in which Central redistributes the vote of a current voter for the eliminated candidate to the voter's most-preferred remaining candidate. It then proceeds to Step 131$a$-6, which checks if all current voters for the eliminated candidate have been considered. If they have not, the process repeats Step 131$a$-5 for another current voter for the eliminated candidate. Otherwise, the process returns to Step 131$a$-2.

FIG. 11$b$ details the process by which Central computes the results of a submission round (Step 131), for an exemplary embodiment of a school choice mechanism. In FIG. 11$b$, the school choice mechanism implements the Gale-Shapley Deferred Acceptance algorithm. The process begins with Step 131$b$-1, in which, for each student who does not have an "offer" being held by any school, Central distributes offers to the student's most-preferred school that has not already rejected the student. In the first iteration of FIG. 11$b$, Central distributes offers to every student's first-choice school. The process proceeds to Step 131$b$-2, in which Central considers one of the schools that it has not previously considered. It continues to Step 131$b$-3, in which Central sorts the students who have made offers to the considered school in descending order of the school's formulaic preferences. In preferred embodiments, ties are broken using random numbers. It then proceeds to 131$b$-4, in which, if the school has m slots but if n>m offers have been made to the school, Central "rejects" all but the top m students in the sort (i.e., the students who rank the lowest in the school's formulaic preferences). It then proceeds to Step 131$b$-5, which checks if all schools have been considered. If they have not, the process returns to Step 131$b$-2 for another school. Otherwise, the process proceeds to Step 131$b$-6, which checks if there are unmatched students who can still make offers (i.e., any students who do not have an offer being held by a school, but have any schools remaining in their rankings to which no offer has yet been made). If there are such students, the process returns to Step 131*b*-1. Otherwise, the process proceeds to Step 132. At this point, all students who have offers being held by a given school are assigned to the given school, and all students who do not have offers being held by any school are treated as unassigned.

FIG. 11*c* details the process by which Central computes the results of a submission round (Step 131), for an exemplary embodiment of an auction mechanism. In FIG. 11*c*, the auction mechanism is an exemplary clock auction. The process begins with Step 131*c*-1, in which a status flag is initialized at "Conclude". The process continues with Step 131*c*-2, in which Central considers one of the types of items in the auction that it has not previously considered. It then proceeds to Step 131*c*-3, in which Central computes the aggregate demand at the clock price for the considered type of item. It continues to Step 131*c*-4, in which Central determines whether the computed aggregate demand is strictly greater than the available supply at the clock price. If the computed aggregate demand is strictly greater than the available supply, it proceeds to Step 131*c*-5, in which the status flag is reset to "Continue". After Step 131*c*-5, or if computed aggregate demand is less than or equal to supply, the process proceeds to Step 131*c*-6, which checks if all types of items in the auction have been considered. If they have not, the process returns to Step 131*c*-2 for another type of item in the auction. Otherwise, the process proceeds to Step 132. Note that, in this embodiment, the status flag will be the information used at Step 132 as to whether all rounds are over and, if there is another submission round, the computed aggregate demands may be disclosed to bidders and may be used in setting the next round's clock prices.

Additional Embodiments

In other alternative embodiments, instead of Step 122 (Every Intranet sends additional information) occurring after the end of the submission round, it occurs during the submission round. However, additional protocols are implemented so that Central does not make use of the additional information until after the end of the submission round. For example, there are two central computers: Central 1 and Central 2. Central 1 performs essentially all of the functions that have been described heretofore of Central. The sole purpose of Central 2 is to accept uploads of the additional information of Step 122 during the submission round and to serve as a secure repository of the additional information until the end of the submission round. In one preferred embodiment, all network traffic involving Central 2 is monitored and, to the extent possible, all outbound file transfers from Central 2 are blocked. In a second preferred embodiment, the additional information of Step 122 is further encrypted using a procedure that can be de-encrypted without a key, but the encryption process is designed so that the computational time needed for de-encryption without a key would exceed the duration of the submission round. The advantage of such alternative embodiments is that the main embodiments provide a participant with the potential opportunity to renounce its choices: the participant might decline to carry out Step 122. In the alternative embodiments, the participant would have already carried out Step 122—and provided Central with the information needed to interpret the vectors of Step 112—at the same time that the participant carried out its part of Step 112.

The encryption processes for voting systems described herein can also be used to implement more tamper-proof voting systems. Currently, election authorities have concerns with electronic bidding systems, as they may potentially be hacked and the vote totals altered. In the current art, a standard method for detecting and correcting the manipulation of vote counts is to require the system to print a paper record after each vote is cast. However, this is impractical in a system where votes are cast remotely (as opposed to on-site, in a voting booth). An alternative is for participants to vote online, using the processes described herein, as follows: the participant's computer sends an encrypted submission to Central Computer 1, as in Step 112; and, either simultaneously or later, it sends an additional vector of information to Central Computer 2, as in Step 122. One or both of Central Computers 1 and 2 utilize WORM (write once, read many) storage devices, which only allow information to be written to a drive a single time and which physically prevent the drive from erasing the data. As described above, Central Computer 1 is able to keep an accurate real-time count of valid submissions, although the votes themselves are indecipherable without access to Central Computer 2. There is very strong protection against the alteration of votes, since the encrypted submissions and the additional vectors of information are stored on independent computer systems, one or both systems utilize WORM storage, and the alteration would be fully detected if the data on only one system were altered, without the corresponding complex change being made to the data on the other system. There is similarly strong protection against the deletion of votes. Finally, one can structure the process so that fraudulent addition of votes ("ballot-box stuffing") is difficult. In particular, since each submission is associated with a participant and voting records are pseudonymous on one of the systems, it is difficult for a hacker to stuff ballots without creating duplicate records (which are detectable). Furthermore, the real-time count of valid submissions can be utilized to monitor for ballot stuffing. Finally, post-election audit procedures can be constructed so that participants are able to check whether their own submissions were counted.

The several examples described herein are exemplary of the invention, whose scope is not limited thereby but rather is indicated in the attached claims.

The invention claimed is:

1. A computer system for securing submissions in a choice mechanism with at least two participants while simultaneously validating the submissions, said computer system comprising at least one computer, said choice mechanism using submissions that express one or more choices selected from a plurality of possible choices, comprising:

receiving means of a first computer of said computer system for receiving a submission from each of at least two participants, wherein each said submission expresses one or more choices selected from a plurality of possible choices and wherein the choices expressed within each said submission are encrypted; and validating means of said first computer for validating each said submission in relation to one or more constraints on the choices expressed within said submission, wherein said validating occurs while the choices expressed within each said submission are encrypted and without knowledge of the choices expressed within each said submission.

2. The computer system of claim 1, wherein the choices expressed within each said submission are encrypted by a process of random permutation.

3. The computer system of claim 1, wherein the choices expressed within each said submission are encrypted by a process of secure advance instructions.

4. The computer system of claim 1, which further comprises encrypting means of a second computer of said computer system for encrypting a submission from one of the at least two participants, sending means of said second computer for sending an encrypted submission from said second computer to said first computer, encrypting means of a third computer of said computer system for encrypting a submission from another of the at least two participants, and sending means of said third computer for sending an encrypted submission from said third computer to said first computer, said second and third computers each located remotely from said first computer and interconnected by a computer network.

5. The computer system of claim 4, wherein each said encrypting means encrypts a submission by a process of random permutation.

6. The computer system of claim 4, wherein each said encrypting means encrypts a submission by a process of secure advance instructions.

7. The computer system of claim 1, which further comprises rejecting means of said first computer for rejecting a submission that cannot be validated in relation to one or more constraints on the choices expressed within said submission.

8. The computer system of claim 4, which further comprises rejecting means of said first computer for rejecting a submission that cannot be validated in relation to one or more constraints on the choices expressed within said submission.

9. The computer system of claim 7, wherein submissions are received by the receiving means during a submission round and wherein a submission that cannot be validated is rejected by the rejecting means before the end of the submission round.

10. The computer system of claim 8, wherein submissions are received by the receiving means during a submission round and wherein a submission that cannot be validated is rejected by the rejecting means before the end of the submission round.

11. The computer system of claim 8, which further comprises informing means of said first computer for informing a computer that encrypted a rejected submission that the rejected submission has been rejected.

12. The computer system of claim 10, which further comprises informing means of said first computer for informing a computer that encrypted a rejected submission that the rejected submission has been rejected, and wherein the computer that encrypted the rejected submission is informed before the end of the submission round.

13. The computer system of claim 1, wherein the plurality of possible choices are elements of a set and wherein each said submission is encrypted so as to permit validation of whether said submission expresses an element of said set.

14. The computer system of claim 2, wherein the plurality of possible choices are elements of a set and wherein each said submission is encrypted so as to permit validation of whether said submission expresses an element of said set.

15. The computer system of claim 3, wherein the plurality of possible choices are elements of a set and wherein each said submission is encrypted so as to permit validation of whether said submission expresses an element of said set.

16. The computer system of claim 4, wherein the plurality of possible choices are elements of a set and wherein each said submission is encrypted so as to permit validation of whether said submission expresses an element of said set.

17. The computer system of claim 12, wherein the plurality of possible choices are elements of a set and wherein each said submission is encrypted so as to permit validation of whether said submission expresses an element of said set.

18. The computer system of claim 1, wherein the plurality of possible choices are subsets of a set and wherein each said submission is encrypted so as to permit validation of whether said submission expresses a valid subset of said set.

19. The computer system of claim 2, wherein the plurality of possible choices are subsets of a set and wherein each said submission is encrypted so as to permit validation of whether said submission expresses a valid subset of said set.

20. The computer system of claim 3, wherein the plurality of possible choices are subsets of a set and wherein each said submission is encrypted so as to permit validation of whether said submission expresses a valid subset of said set.

21. The computer system of claim 4, wherein the plurality of possible choices are subsets of a set and wherein each said submission is encrypted so as to permit validation of whether said submission expresses a valid subset of said set.

22. The computer system of claim 12, wherein the plurality of possible choices are subsets of a set and wherein each said submission is encrypted so as to permit validation of whether said submission expresses a valid subset of said set.

23. The computer system of claim 1, wherein the plurality of possible choices are rankings of elements of a set and wherein each said submission is encrypted so as to permit validation of whether said submission expresses a valid ranking of elements of said set.

24. The computer system of claim 2, wherein the plurality of possible choices are rankings of elements of a set and wherein each said submission is encrypted so as to permit validation of whether said submission expresses a valid ranking of elements of said set.

25. The computer system of claim 3, wherein the plurality of possible choices are rankings of elements of a set and wherein each said submission is encrypted so as to permit validation of whether said submission expresses a valid ranking of elements of said set.

26. The computer system of claim 4, wherein the plurality of possible choices are rankings of elements of a set and wherein each said submission is encrypted so as to permit validation of whether said submission expresses a valid ranking of elements of said set.

27. The computer system of claim 12, wherein the plurality of possible choices are rankings of elements of a set and wherein each said submission is encrypted so as to permit validation of whether said submission expresses a valid ranking of elements of said set.

28. A computer system according to claim 1 for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

29. A computer system according to claim 2 for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

30. A computer system according to claim 3 for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

31. A computer system according to claim 4 for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

32. A computer system according to claim 12 for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

33. A method for securing submissions in a choice mechanism with at least two participants while simultaneously validating the submissions, said method implemented on a computer system comprising at least one computer, said choice mechanism using submissions that express one or more choices selected from a plurality of possible choices, comprising:
   receiving a submission from each of at least two participants on a first computer of said computer system, wherein each said submission expresses one or more choices selected from a plurality of possible choices and wherein the choices expressed within each said submission are encrypted; and
   validating each said submission on said first computer in relation to one or more constraints on the choices expressed within said submission, wherein said validating occurs while the choices expressed within each said submission are encrypted and without knowledge of the choices expressed within each said submission.

34. The method of claim 33, wherein the choices expressed within each said submission are encrypted by a process of random permutation.

35. The method of claim 33, wherein the choices expressed within each said submission are encrypted by a process of secure advance instructions.

36. The method of claim 33, which further comprises encrypting a submission from one of the at least two participants on a second computer of said computer system, sending an encrypted submission from said second computer to said first computer, encrypting a submission from another of the at least two participants on a third computer of said computer system, and sending an encrypted submission from said third computer to said first computer, said second and third computers each located remotely from said first computer and interconnected by a computer network.

37. The method of claim 36, wherein said second computer and said third computer each encrypt a submission by a process of random permutation.

38. The method of claim 36, wherein said second computer and said third computer each encrypt a submission by a process of secure advance instructions.

39. The method of claim 33, which further comprises rejecting a submission that cannot be validated in relation to one or more constraints on the choices expressed within said submission.

40. The method of claim 36, which further comprises rejecting a submission that cannot be validated in relation to one or more constraints on the choices expressed within said submission.

41. The method of claim 39, wherein submissions are received during a submission round and wherein a submission that cannot be validated is rejected before the end of the submission round.

42. The method of claim 40, wherein submissions are received during a submission round and wherein a submission that cannot be validated is rejected before the end of the submission round.

43. The method of claim 40, which further comprises informing a computer that encrypted a rejected submission that the rejected submission has been rejected.

44. The method of claim 42, which further comprises informing a computer that encrypted a rejected submission that the rejected submission has been rejected, and wherein the computer that encrypted the rejected submission is informed before the end of the submission round.

45. The method of claim 33, wherein the plurality of possible choices are elements of a set and wherein each said submission is encrypted so as to permit validation of whether said submission expresses an element of said set.

46. The method of claim 34, wherein the plurality of possible choices are elements of a set and wherein each said submission is encrypted so as to permit validation of whether said submission expresses an element of said set.

47. The method of claim 35, wherein the plurality of possible choices are elements of a set and wherein each said submission is encrypted so as to permit validation of whether said submission expresses an element of said set.

48. The method of claim 36, wherein the plurality of possible choices are elements of a set and wherein each said submission is encrypted so as to permit validation of whether said submission expresses an element of said set.

49. The method of claim 44, wherein the plurality of possible choices are elements of a set and wherein each said submission is encrypted so as to permit validation of whether said submission expresses an element of said set.

50. The method of claim 33, wherein the plurality of possible choices are subsets of a set and wherein each said submission is encrypted so as to permit validation of whether said submission expresses a valid subset of said set.

51. The method of claim 34, wherein the plurality of possible choices are subsets of a set and wherein each said submission is encrypted so as to permit validation of whether said submission expresses a valid subset of said set.

52. The method of claim 35, wherein the plurality of possible choices are subsets of a set and wherein each said submission is encrypted so as to permit validation of whether said submission expresses a valid subset of said set.

53. The method of claim 36, wherein the plurality of possible choices are subsets of a set and wherein each said submission is encrypted so as to permit validation of whether said submission expresses a valid subset of said set.

54. The method of claim 44, wherein the plurality of possible choices are subsets of a set and wherein each said submission is encrypted so as to permit validation of whether said submission expresses a valid subset of said set.

55. The method of claim 33, wherein the plurality of possible choices are rankings of elements of a set and wherein each said submission is encrypted so as to permit validation of whether said submission expresses a valid ranking of elements of said set.

56. The method of claim 34, wherein the plurality of possible choices are rankings of elements of a set and wherein each said submission is encrypted so as to permit validation of whether said submission expresses a valid ranking of elements of said set.

57. The method of claim 35, wherein the plurality of possible choices are rankings of elements of a set and wherein each said submission is encrypted so as to permit validation of whether said submission expresses a valid ranking of elements of said set.

58. The method of claim 36, wherein the plurality of possible choices are rankings of elements of a set and wherein each said submission is encrypted so as to permit validation of whether said submission expresses a valid ranking of elements of said set.

59. The method of claim 44, wherein the plurality of possible choices are rankings of elements of a set and wherein each said submission is encrypted so as to permit validation of whether said submission expresses a valid ranking of elements of said set.

60. A method according to claim 33 for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

61. A method according to claim 34 for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

62. A method according to claim 35 for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

63. A method according to claim 36 for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

64. A method according to claim 44 for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

65. A non-transitory computer readable medium storing instructions which, when executed by a computer system, implements a method for securing submissions in a choice mechanism with at least two participants while simultaneously validating the submissions, said method implemented on a computer system comprising at least one computer, said choice mechanism using submissions that express one or more choices selected from a plurality of possible choices, said method comprising:
receiving a submission from each of at least two participants on a first computer of said computer system, wherein each said submission expresses one or more choices selected from a plurality of possible choices and wherein the choices expressed within each said submission are encrypted; and
validating each said submission on said first computer in relation to one or more constraints on the choices expressed within said submission, wherein said validating occurs while the choices expressed within each said submission are encrypted and without knowledge of the choices expressed within each said submission.

66. The non-transitory computer readable medium of claim 65, wherein the choices expressed within each said submission are encrypted by a process of random permutation.

67. The non-transitory computer readable medium of claim 65, wherein the choices expressed within each said submission are encrypted by a process of secure advance instructions.

68. The non-transitory computer readable medium of claim 65 storing instructions which, when executed by a computer system, implements a method which further comprises encrypting a submission from one of the at least two participants on a second computer of said computer system, sending an encrypted submission from said second computer to said first computer, encrypting a submission from another of the at least two participants on a third computer of said computer system, and sending an encrypted submission from said third computer to said first computer, said second and third computers each located remotely from said first computer and interconnected by a computer network.

69. The non-transitory computer readable medium of claim 68, wherein said second computer and said third computer each encrypt a submission by a process of random permutation.

70. The non-transitory computer readable medium of claim 68, wherein said second computer and said third computer each encrypt a submission by a process of secure advance instructions.

71. The non-transitory computer readable medium of claim 65 storing instructions which, when executed by a computer system, implements a method which further comprises rejecting a submission that cannot be validated in relation to one or more constraints on the choices expressed within said submission.

72. The non-transitory computer readable medium of claim 68 storing instructions which, when executed by a computer system, implements a method which further comprises rejecting a submission that cannot be validated in relation to one or more constraints on the choices expressed within said submission.

73. The non-transitory computer readable medium of claim 71, wherein submissions are received during a submission round and wherein a submission that cannot be validated is rejected before the end of the submission round.

74. The non-transitory computer readable medium of claim 72, wherein submissions are received during a submission round and wherein a submission that cannot be validated is rejected before the end of the submission round.

75. The non-transitory computer readable medium of claim 72 storing instructions which, when executed by a computer system, implements a method which further comprises informing a computer that encrypted a rejected submission that the rejected submission has been rejected.

76. The non-transitory computer readable medium of claim 74 storing instructions which, when executed by a computer system, implements a method which further comprises informing a computer that encrypted a rejected submission that the rejected submission has been rejected, and wherein the computer that encrypted the rejected submission is informed before the end of the submission round.

77. The non-transitory computer readable medium of claim 65, wherein the plurality of possible choices are elements of a set and wherein each said submission is encrypted so as to permit validation of whether said submission expresses an element of said set.

78. The non-transitory computer readable medium of claim 66, wherein the plurality of possible choices are elements of a set and wherein each said submission is encrypted so as to permit validation of whether said submission expresses an element of said set.

79. The non-transitory computer readable medium of claim 67, wherein the plurality of possible choices are elements of a set and wherein each said submission is encrypted so as to permit validation of whether said submission expresses an element of said set.

80. The non-transitory computer readable medium of claim 68, wherein the plurality of possible choices are elements of a set and wherein each said submission is encrypted so as to permit validation of whether said submission expresses an element of said set.

81. The non-transitory computer readable medium of claim 76, wherein the plurality of possible choices are elements of a set and wherein each said submission is encrypted so as to permit validation of whether said submission expresses an element of said set.

82. The non-transitory computer readable medium of claim 65, wherein the plurality of possible choices are subsets of a set and wherein each said submission is encrypted so as to permit validation of whether said submission expresses a valid subset of said set.

83. The non-transitory computer readable medium of claim 66, wherein the plurality of possible choices are subsets of a set and wherein each said submission is encrypted so as to permit validation of whether said submission expresses a valid subset of said set.

84. The non-transitory computer readable medium of claim 67, wherein the plurality of possible choices are subsets of a set and wherein each said submission is encrypted so as to permit validation of whether said submission expresses a valid subset of said set.

85. The non-transitory computer readable medium of claim 68, wherein the plurality of possible choices are subsets of a set and wherein each said submission is encrypted so as to permit validation of weather said submission expresses a valid subset of said set.

86. The non-transitory computer readable medium of claim 76, wherein the plurality of possible choices are subsets of a set and wherein each said submission is encrypted so as to permit validation of whether said submission expresses a valid subset of said set.

87. The non-transitory computer readable medium of claim 65, wherein the plurality of possible choices are rankings of elements of a set and wherein each said submission is encrypted so as to permit validation of whether said submission expresses a valid ranking of elements of said set.

88. The non-transitory computer readable medium of claim 66, wherein the plurality of possible choices are rankings of elements of a set and wherein each said submission is encrypted so as to permit validation of whether said submission expresses a valid ranking of elements of said set.

89. The non-transitory computer readable medium of claim 67, wherein the plurality of possible choices are rankings of elements of a set and wherein each said submission is encrypted so as to permit validation of whether said submission expresses a valid ranking of elements of said set.

90. The non-transitory computer readable medium of claim 68, wherein the plurality of possible choices are rankings of elements of a set and wherein each said submission is encrypted so as to permit validation of whether said submission expresses a valid ranking of elements of said set.

91. The non-transitory computer readable medium of claim 76, wherein the plurality of possible choices are rankings of elements of a set and wherein each said submission is encrypted so as to permit validation of whether said submission expresses a valid ranking of elements of said set.

92. A non-transitory computer readable medium according to claim 65 storing instructions which, when executed by a computer system, implements a method for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

93. A non-transitory computer readable medium according to claim 66 storing instructions which, when executed by a computer system, implements a method for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

94. A non-transitory computer readable medium according to claim 67 storing instructions which, when executed by a computer system, implements a method for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

95. A non-transitory computer readable medium according to claim 68 storing instructions which, when executed by a computer system, implements a method for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

96. A non-transitory computer readable medium according to claim 76 storing instructions which, when executed by a computer system, implements a method for securing submissions in a dynamic choice mechanism, wherein a participant's current submission is constrained by one or more constraints in relation to the participant's prior submissions and wherein a current submission is encrypted so as to permit validation of one or more constraints in relation to the participant's prior submissions.

* * * * *